(12) United States Patent
Griffis et al.

(10) Patent No.: US 12,486,186 B2
(45) Date of Patent: Dec. 2, 2025

(54) PROCESS OF USING DEMINERALIZED WATER FOR CHLORATE REDUCTION IN ON-SITE BRINE ELECTROCHLORINATION SYSTEMS

(71) Applicant: Evoqua Water Technologies Ltd, Portskewett Caldicot (GB)

(72) Inventors: Joshua Griffis, Ashburnham, MA (US); Simon P. Dukes, Chelmsford, MA (US); Wenxin Du, Dover, NH (US); Daniel R. Corrado, Rarian, NJ (US); Frederick C. Wilkins, Pepperell, MA (US); Xiangyi Qiao, Singapore (SG); Romulo Dador Conde, Singapore (SG); David Bonnick, Heathfield (GB); Ryan Flood, Natick, MA (US)

(73) Assignee: Evoqua Water Technologies Ltd., Caldicot (GB)

( * ) Notice: Subject to any disclaimer, the term of this patent is extended or adjusted under 35 U.S.C. 154(b) by 394 days.

(21) Appl. No.: 18/031,144

(22) PCT Filed: Oct. 8, 2021

(86) PCT No.: PCT/US2021/054219
§ 371 (c)(1),
(2) Date: Apr. 10, 2023

(87) PCT Pub. No.: WO2022/076851
PCT Pub. Date: Apr. 14, 2022

(65) Prior Publication Data
US 2023/0373833 A1    Nov. 23, 2023

Related U.S. Application Data

(60) Provisional application No. 63/246,969, filed on Sep. 22, 2021, provisional application No. 63/246,832, (Continued)

(51) Int. Cl.
*C02F 1/04* (2023.01)
*C02F 1/00* (2023.01)
(Continued)

(52) U.S. Cl.
CPC ............... *C02F 9/00* (2013.01); *C02F 1/008* (2013.01); *C25B 1/26* (2013.01); *C02F 1/04* (2013.01);
(Continued)

(58) Field of Classification Search
CPC .... C02F 9/00; C02F 1/008; C02F 1/04; C02F 1/441; C02F 1/442; C02F 1/4674;
(Continued)

(56) References Cited

U.S. PATENT DOCUMENTS 8,784,733 B2 * 7/2014 Alarid ..................... C02F 1/76
204/194
8,968,575 B2   3/2015 Zolotarsky et al.
(Continued)

FOREIGN PATENT DOCUMENTS

AU    2012268955 A1 *  2/2014  .......... C02F 1/46104
FR       2915988 A1 * 11/2008  ................ C02F 9/00
(Continued)

OTHER PUBLICATIONS

Chatellier, Xavier, "Extended European Search Report", European Patent Application No. 21878638.2, mailed May 23, 2024, 9 pages.
(Continued)

*Primary Examiner* — Joseph W Drodge

(57) ABSTRACT

An electrochlorination process includes treating water from a source of water in an advanced water conditioning system that removes at least a portion of anions and cations from the water and produces demineralized water, blending the demineralized water with sodium chloride to form a brine solution, and treating the brine solution in an electrolyzer to
(Continued)

form a disinfection solution including sodium hypochlorite having a concentration of chlorate of less than 0.25 mg/L.

28 Claims, 19 Drawing Sheets

Related U.S. Application Data filed on Sep. 22, 2021, provisional application No. 63/245,250, filed on Sep. 17, 2021, provisional application No. 63/105,930, filed on Oct. 27, 2020, provisional application No. 63/089,258, filed on Oct. 8, 2020.

(51) Int. Cl.
| | |
|---|---|
| *C02F 1/44* | (2023.01) |
| *C02F 1/46* | (2023.01) |
| *C02F 9/00* | (2023.01) |
| *C25B 1/26* | (2006.01) |
| *C02F 1/467* | (2023.01) |
| *C02F 1/469* | (2023.01) |
| *C02F 1/66* | (2023.01) |

(52) U.S. Cl.
CPC ............ *C02F 1/441* (2013.01); *C02F 1/442* (2013.01); *C02F 1/4674* (2013.01); *C02F 1/4695* (2013.01); *C02F 1/66* (2013.01); *C02F 2201/4614* (2013.01); *C02F 2209/02* (2013.01); *C02F 2209/29* (2013.01); *C02F 2209/40* (2013.01); *C02F 2303/04* (2013.01)

(58) Field of Classification Search
CPC .. C02F 1/4695; C02F 1/66; C02F 2201/4614; C02F 2209/02; C02F 2209/29; C02F 2209/40; C02F 2303/04; C02F 2001/425; C02F 2201/46125; C02F 2209/05; C02F 2209/06; C02F 1/42; C02F 1/4693; C02F 2001/422; C02F 2001/427; C25B 9/15; C25B 9/70; C25B 11/036; C25B 1/26
See application file for complete search history.

(56) References Cited

U.S. PATENT DOCUMENTS

| | | | |
|---|---|---|---|
| 10,464,833 B2 | 11/2019 | Yeh et al. | |
| 11,414,330 B2* | 8/2022 | Dukes ................ | C02F 1/46104 |
| 2004/0047781 A1* | 3/2004 | Becenel, Jr. ........... | C25B 15/08 |
| | | | 423/46 |
| 2006/0113257 A1* | 6/2006 | Fernandez ............... | B63J 4/002 |
| | | | 210/756 |
| 2008/0017519 A1 | 1/2008 | Siemer et al. | |
| 2009/0008268 A1 | 1/2009 | Salathe et al. | |
| 2011/0129388 A1* | 6/2011 | Alarid .................. | C01B 11/024 |
| | | | 424/661 |
| 2012/0318748 A1 | 12/2012 | Carlson et al. | |
| 2019/0263697 A1* | 8/2019 | Ganzi ..................... | C02F 9/00 |
| 2021/0130966 A1* | 5/2021 | Griffis .................. | C02F 1/4674 |
| 2021/0395911 A1* | 12/2021 | Dukes ................. | H01M 8/0656 |

FOREIGN PATENT DOCUMENTS

| | | | | |
|---|---|---|---|---|
| WO | 2008150541 A1 | 12/2008 | | |
| WO | 2012172118 A1 | 12/2012 | | |
| WO | WO-2018165127 A1 * | 9/2018 | .......... | H01M 8/0656 |

OTHER PUBLICATIONS

International Search Report in corresponding PCT/US21/54219, dated Jan. 21, 2022.

* cited by examiner

| | Input |
|---|---|
| OSEC Series | B_Plus |
| OSEC Model | OSEC®B-Plus 2000 |
| Inlet Temp °C | 21 |
| Dilution Flow Rate, gph | 1204.6 |
| Brine Flow, gph | 102 |
| Current, Amps | 1300 |
| Output (Metric/Imperial) | Metric |

FIG. 7

| Predicted Performance | |
|---|---|
| Product Strength | 0.78% |
| Chlorate (ppm) | 313 |
| ClO3/Cl ratio | 4.0% |
| Power (kWh DC/Kg Cl) | 3.30 |
| Power (kWh AC/Kg Cl) | 3.88 |
| Salt Use (Kg salt/Kg Cl) | 3.19 |
| Cl Capacity (Kg Cl per day) | 924 |
| Voltage (V) | 97.7 |
| Product Temperature (°C) | 34.0 |

*FIG. 8*

| Parameter | Standard | Suggested Guideline |
|---|---|---|
| Content | LiPon/Pt | 1500mg/kg 50mg/kg Diluent |
| Water/Brine Ratio | 1:1.0 | 1:0.1 with +0.2/-0.1 tolerance |
| Total Flow | 2400 liters per hour | 2850 liters per hour +/- 5.0 liters per hour |
| Inlet Temperature | 12-27C | 20C |
| Product Ratio Loading 2CC | 50 g/m8 | 35 g/m8 |

FIG. 10A

PROCESS OF USING DEMINERALIZED WATER FOR CHLORATE REDUCTION IN ON-SITE BRINE ELECTROCHLORINATION SYSTEMS

BACKGROUND

1. Field of Invention

Aspects and embodiments disclosed herein are generally directed to electrochemical devices, and more specifically, to electrochlorination cells and devices, methods of fabricating and operating same, and systems utilizing same.

2. Discussion of Related Art

Electrochemical devices that perform processes based on chemical reactions at electrodes are widely used in industrial and municipal implementations. Examples of reactions include:

A. Electrochlorination with generation of sodium hypochlorite from sodium chloride and water.

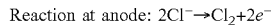
Reaction at anode: $2Cl^- \rightarrow Cl_2 + 2e^-$

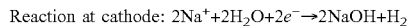
Reaction at cathode: $2Na^+ + 2H_2O + 2e^- \rightarrow 2NaOH + H_2$

In solution: $Cl_2 + 2OH^- \rightarrow ClO^- + Cl^- + H_2O$

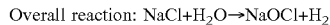
Overall reaction: $NaCl + H_2O \rightarrow NaOCl + H_2$

B. Generation of sodium hydroxide and chlorine from sodium chloride and water, with a cation exchange membrane separating the anode and the cathode:

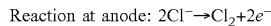
Reaction at anode: $2Cl^- \rightarrow Cl_2 + 2e^-$

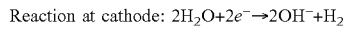
Reaction at cathode: $2H_2O + 2e^- \rightarrow 2OH^- + H_2$

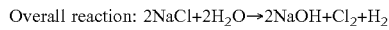
Overall reaction: $2NaCl + 2H_2O \rightarrow 2NaOH + Cl_2 + H_2$

C. Vanadium redox battery for energy storage, with a proton permeable membrane separating the electrodes:

During charging:

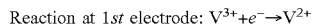
Reaction at 1st electrode: $V^{3+} + e^- \rightarrow V^{2+}$

Reaction at 2nd electrode: $V^{4+} \rightarrow V^{5+} + e^-$

During discharging:

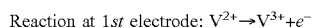
Reaction at 1st electrode: $V^{2+} \rightarrow V^{3+} + e^-$

Reaction at 2nd electrode: $V^{5+} + e^- \rightarrow V^{4+}$

SUMMARY

In accordance with one aspect, there is provided an electrochlorination process. The process comprises treating water from a source of water in an advanced water conditioning system that removes at least a portion of anions and cations from the water and produces demineralized water, blending the demineralized water with sodium chloride to form a brine solution, and treating the brine solution in an electrolyzer to form a disinfection solution including sodium hypochlorite having a concentration of chlorate of less than 0.25 mg/L.

In some embodiments, treating the water in the advanced water conditioning system includes filtering the water through a pressure driven separation apparatus.

In some embodiments, treating the water in the advanced water conditioning system includes treating the water in an electrically driven separation apparatus.

In some embodiments, treating the water in the advanced water conditioning system includes treating the water in a distillation unit.

In some embodiments, the method further comprises blending water from a source of non-demineralized water with the sodium chloride in addition to the demineralized water.

In some embodiments, the method further comprises adjusting a pH water from the source of water to a pH of between about 6 and 10.

In some embodiments, forming the disinfection solution includes forming the disinfection solution with a concentration of between about 0.5 wt % and about 1.0 wt % sodium hypochlorite.

In some embodiments, the method further comprises monitoring and controlling at least one of sodium chloride concentration of the brine solution introduced into the electrolyzer, or flow rate of the brine solution introduced into the electrolyzer. Monitoring and controlling the sodium chloride concentration of the brine solution introduced into the electrolyzer may comprise forming a brine solution with a sodium chloride concentration of between about 22 g/L and about 30 g/L. Monitoring and controlling the flow rate of the brine solution introduced into the electrolyzer may comprise introducing the brine solution into the electrolyzer at a ratio of flow rates of 8:1 to 13:1 dilution water to concentrated brine flows.

In some embodiments, the method further comprises monitoring and controlling at least one of temperature of the brine solution introduced into the electrolyzer, temperature of the disinfection solution, or power supplied to the electrolyzer. Monitoring and controlling the temperature of the brine solution introduced into the electrolyzer may include introducing the brine solution into the electrolyzer at a temperature of between about 10 degrees Celsius ad about 30 degrees Celsius. Monitoring and controlling the power supplied to the electrolyzer may include operating the electrolyzer with a current density of between about 1.06 amp/in$^2$ of electrode area and about 1.17 amp/in$^2$ of electrode area.

In some embodiments, treating the water from the source of water comprises treating potable water from a source of potable water.

In accordance with another aspect, there is provided an electrochlorination system. The electrochlorination system comprises an advanced water conditioning system including an inlet fluidly connectable to a source of water and an outlet, the advanced water conditioning system configured to removes at least a portion of anions and cations from the water to produce demineralized water, a source of sodium chloride, a blending vessel having an inlet fluidly connectable to the outlet of the advanced water conditioning system, an inlet in communication with the source of sodium chloride, and an outlet, the blending vessel configured to mix sodium chloride and the demineralized water to produce a brine solution, an electrolyzer having an inlet fluidly connectable with the outlet of the blending vessel and configured to receive the brine solution, and a controller configured to cause a power source to deliver power to the electrolyzer at a current sufficient to generate a sodium hypochlorite solution having a concentration of chlorate of less than 0.25 mg/L.

In some embodiments, the system further comprises a source of potable water in fluid communication with the blending vessel.

In some embodiments, the advanced water conditioning system comprises a pressure driven separation system.

In some embodiments, the advanced water conditioning system comprises an electrically driven separation apparatus.

In some embodiments, the advanced water conditioning system comprises a distillation unit.

In some embodiments, the system further comprises sensors and a controller configured to monitor and control at least one of sodium chloride concentration of the brine solution introduced into the electrolyzer, flow rate of the brine solution introduced into the electrolyzer, or temperature of the brine solution introduced into the electrolyzer.

In some embodiments, the controller is configured to control introduction of the sodium chloride and water into a brine tank to form a brine solution with a sodium chloride concentration of between about 22 g/L and about 30 g/L.

In some embodiments, the controller is configured to control a heat exchanger to adjust a temperature of the brine solution and introduce the brine solution into the electrolyzer at a temperature of between about 10 degrees Celsius and about 30 degrees Celsius.

In some embodiments, wherein the controller is configured to control a brine pump to flow the brine solution into the electrolyzer at a ratio of flow rates of 8:1 to 13:1 dilution water to concentrated brine flows.

In some embodiments, the system further comprises sensors and a controller configured to monitor and control at least one of temperature of the sodium hypochlorite solution, or power supplied to the electrolyzer.

In some embodiments, the controller is configured to operate the electrolyzer with a current density of between about 1.06 amp/in$^2$ of electrode area and about 1.17 amp/in$^2$ of electrode area.

In some embodiments, the system further comprises a source of pH adjustment solution fluidly connectable to the source of water and configured to maintain a pH of water from the source of water between about 6 and 10.

In some embodiments, the system further comprises a shut off valve downstream of the electrolyzer, the controller further configured to close the shut off valve responsive to a level of chlorate in the sodium hypochlorite solution being outside of an acceptable range.

In accordance with another aspect, there is provided a method of retrofitting an electrochlorination system. The method comprises providing an advanced water conditioning system configured to remove a portion of anions and cations from water from a source of water and produce demineralized water, connecting an outlet of the advanced water conditioning system to a source of brine in fluid communication with an inlet of an electrolyzer of the system, and providing a controller of the electrochlorination system programmed to cause the electrochlorination system to mix the demineralized water with the brine and operate the electrolyzer under conditions sufficient to generate a sodium hypochlorite solution having a concentration of chlorate of less than 0.25 mg/L.

In some embodiments, the method further comprises a providing and installing a pH adjustment sub-system including a pH adjustment solution and metering valve or pump and configured to dose the water from the source of water with the pH adjustment system in an amount sufficient to maintain a pH of the water from the source of water at between about 6 and 10.

In some embodiments, the method further comprises installing a shut off valve downstream of the electrolyzer and programming the controller to cause the shut off valve to close responsive to a level of chlorate in the sodium hypochlorite solution being outside of an acceptable range.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 7 illustrates example operating parameters of an electrolyzer of an electrochlorination system as disclosed herein;

FIG. 8 illustrates predicted performance parameters of an electrolyzer of an electrochlorination system as disclosed herein;

FIG. 10A illustrates unoptimized and optimized operating parameters for an electrolyzer of an example electrochlorination system;

DETAILED DESCRIPTION

Figure 1:
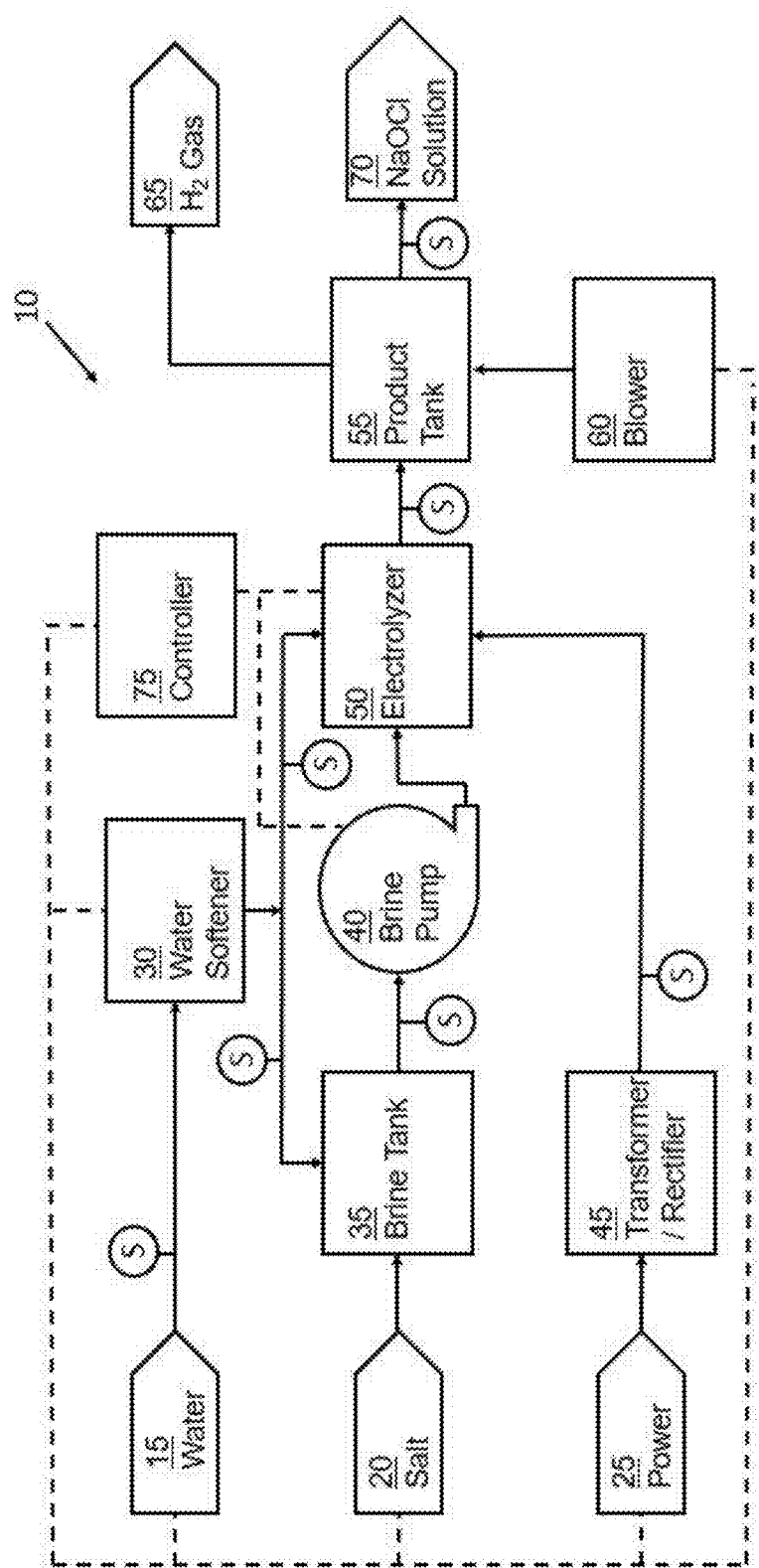
FIG. 1 illustrates a configuration of an embodiment of a brine electrochlorination system.

Aspects and embodiments disclosed herein are not limited to the details of construction and the arrangement of components set forth in the following description or illustrated in the drawings. Aspects and embodiments disclosed herein are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Aspects and embodiments disclosed herein include electrochlorination systems and methods of operation of same. The type and configuration of electrochemical or electrochlorination cells and apparatus is non-limiting.

FIG. 1 illustrates one embodiment of an electrochlorination system 10 configured to generate a sodium hypochlorite solution from brine in accordance with the chemical reactions indicated above in section 2A of the BACKGROUND. As the term is used herein "brine" refers to an aqueous solution of sodium chloride (NaCl).

Inputs to the electrochlorination system 10 include water from a source of water 15, salt (NaCl) from a source of salt 20, and power 25. The water may be potable water having a dissolved solids concentration of 500 mg/L or less, in other embodiments 1.00 mg/L or less, or in other embodiment having a different dissolved solids concentration, depending on the requirements for potable water in the jurisdiction in which the system is located or as defined by the World Health Organization. The salt may be sodium chloride with a purity of 99.5% or greater or, in other embodiments, 99.8% or greater. The salt may be present in the source of salt 20 in a dry form or in an aqueous solution.

Water from the source of water 15 may be directed into a water softener 30. The water softener 30 may include cation exchange media that removes hardness components, for example, magnesium and calcium, or other cations from the water and replaces them with a monovalent ion, for example, sodium (Nat). The water softener 30 does little if anything to remove uncharged dissolved solids or anions from the water from the source of water 15.

Salt from the source of salt 20 is directed into a brine tank 35 where it is mixed with softened water output from the water softener 30 to form a concentrated brine solution. The concentrated brine solution may include, for example, 26 wt % of NaCl in water, although this concentration is given as a non-limiting example. The concentration of NaCl in the concentrated brine solution may be greater or lesser in different embodiments. The concentrated brine in the brine tank 35 may be a fully saturated aqueous solution of NaCl.

Concentrated brine from the brine tank 35 is directed through a brine pump 40 into an electrolyzer 50. At an input to the electrolyzer 50, or upstream of the input to the electrolyzer 50, the concentrated brine may be diluted with additional softened water from the water softener 30 to form a diluted brine. In some embodiments, the dilution factor may be in the range of 8:1 to 16:1 dilution water to concentrated brine.

The electrolyzer is provided with power from the source of power 25, optionally after the power is conditioned in a transformer/rectifier 45 to produce direct current electricity. The electrolyzer converts at least some of the NaCl in the diluted brine into sodium hypochlorite (NaOCl) in accordance with the chemical reactions indicated above in section 2A of the BACKGROUND. A solution including the NaOCl (also referred to herein as a disinfection solution) is output from the electrolyzer 50 into a product tank 55. Gaseous or dissolved hydrogen that may have been produced during treatment of the diluted brine solution in the electrolyzer that is introduced along with the NaOCl solution into the product tank 55 may be removed by blowing air through the product tank 55 with a blower 60. The hydrogen/air mixture may be vented to atmosphere through a hydrogen vent 65 or captured. The hydrogen-degassed NaOCl solution (also referred to herein as a product disinfection solution or a product solution) is output from the system through a product outlet 70 and sent to storage or a point of use.

The electrochlorination system 10 includes a controller 75 that may be in wired or wireless communication with each of the unit operations of the electrochlorination system 10. Various sensors S may be present throughout the electrochlorination system 10 at inlets or outlets of the different unit operations, for example, the source of water 15, the water softener 30, the brine tank 30, the electrolyzer 50, the product tank 55, the source of power 25 or transformer/rectifier 45, or any other unit operations or fluid conduits between any two unit operations or in side stream conduits that branch off fluid conduits between any two unit operations of the system. In some embodiments one or more sensors may be disposed within any of the unit operations, for example, the brine tank 35, product tank 55, the source of water 15, or any other unit operation of the system. The sensors may be any one of pH, temperature, flow rate, conductivity, chemical (for example, NaOCl or NaCl) concentration, pH, or power (voltage and/or current) sensors, or any other form of sensor useful for sensing desired operating conditions of or within the different unit operations or fluid flow streams in the electrochlorination system 10. The sensors S may be each in wired or wireless communication with the controller 75 (connections between sensors and controller not illustrated for clarity). The controller may monitor signals indicative of the different operating conditions of the electrochlorination system 10 provided by the sensors S and adjust operating parameters of any of the unit operations, for example, rates of introduction or water or salt, brine dilution ratio, fluid flow rate through any of the unit operations, power applied to the electrolyzer, etc. based on the signals from the sensors to obtain desired qualities in the output NaOCl solution or to improve operation of the system, for example, to reduce power or salt consumption. In some embodiments, the sensors S and controller 170 may monitor and control at least one of sodium chloride concentration of the brine solution introduced into the electrolyzer, flow rate of the brine solution introduced into the electrolyzer, temperature of the brine solution introduced into the electrolyzer, temperature of the NaOCl solution, or power supplied to the electrolyzer.

One of the issues when using on-site generation of hypochlorite in a system such as the electrochlorination system of FIG. 1 is that chlorate ions are produced as a by-product of the production of the NaOCl from the brine solution.

Chlorate is an anion that can enter drinking water from several potential sources, including from hypochlorite or chlorine dioxide disinfectant use, ozone oxidation of hypochlorite or chlorite and source water contamination from pesticide runoff or papermill discharges.

Chlorine in some form (gaseous, hypochlorite or chloramine) is used in almost 90 percent of drinking water supplies. Hypochlorite is used in more than 20 percent of water supplies, but the numbers are growing because many suppliers have shifted to hypochlorite from free chlorine because of the security and handling risks of chlorine gas.

Chlorate is spontaneously generated in hypochlorite solutions by what are called disproportionation reactions of hypochlorite (hypochlorite reacting with itself), and the amount of chlorate continues to increase during storage of the hypochlorite solutions, potentially reaching several thousand ppm. The rate of conversion is a function of hypochlorite concentration, storage temperature, time, and pH of the hypochlorite solutions.

There are health effects of chlorate. Chlorate competes with iodide for transport to the thyroid, although it does not bind as strongly as perchlorate, and it can be metabolized, whereas perchlorate is very stable after ingestion. Consumption by infants and young children in high concentrations can cause problems to the nervous system and anemia. The same effects could occur in the fetus of a pregnant woman at sufficiently high doses.

The chemistry of chlorate indicates that upon ingestion of small quantities from water in the acidic stomach, it would be reduced by reactions reducing agents like sulfide, nitrite, and iodide that are naturally present.

The European Union is revising its Drinking Water Directive in response to greater understanding of the effects of disinfection by-products. The proposed updates to the EU Drinking Water Directive in 2019, include the addition of haloacetic acids (HAAs) and chlorite/chlorate as substances that need to be controlled. Chlorite and chlorate restrictions on the proposal set a maximum acceptable level of 0.25 mg/l, considerably lower than the value recommended by the WHO of 0.7 mg/l, due to concerns about their effects on the health of children. This means that utilities will need to monitor these new additions and, if applicable, introduce methods to address them.

In one embodiment, an advanced water conditioning system comprising an apparatus to demineralize or deionize water to generate a higher quality water solution, in lieu of a softener to pretreat the water, is provided for an on-site brine electrochlorination system to reduce the formation of chlorate during the process to generate sodium hypochlorite. It has been determined that the water quality plays a more significant role than previously believed and that the water softeners used today may not adequately remove various ions from the water used to generate sodium hypochlorite through on-site brine electrochlorination. This unexpected result has shown that the use of demineralized or deionized water rather than softened potable water in a brine electrochlorination system can in some instances reduce chlorate formation by more than 50%.

As discussed above, for on-site brine electrochlorination systems the main chemical equation for generating product is:

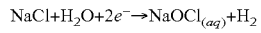

However, it is known that through this process chlorate can form via the two following equations that can lead to the production of chlorate in the generated sodium hypochlorite solution:

1) At Anode:

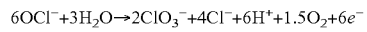

2) In solution:

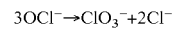

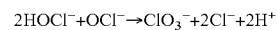

These chemical equations are believed to be heavily dependent on hypochlorite and hypochlorous concentrations, water quality, salt quality, and temperature.

Aspects and embodiments disclosed herein use advanced water conditioning to produce a higher water quality than a traditional water softener may be able to provide, to pretreat feed water for an on-site brine electrochlorination system. An advanced water conditioning system as disclosed herein differs from a water softener as described with respect to the system of FIG. 1 in that it removes not only cations from water to be treated, but also anions and uncharged dissolved solids. Embodiments of an advanced water conditioning system and process as disclosed herein may include any one or more of a deionization unit, an ion exchange unit or units including one or more beds of cation exchange resin and one or more beds of anion exchange resin, or one or more mixed beds of anion and cation exchange resin, a pressure driven separation unit, for example, a reverse osmosis unit or nanofiltration unit, an electrically driven separation unit, for example, an electrodialysis unit or an electrodeionization unit, a distillation unit, or other technologies that demineralizes water to a greater extent than a traditional water softener. These different forms of water treatment systems and processes may be utilized alone or in any suitable combination. For example, in some embodiments, an advanced water conditioning system may include one or more electrically driven separation apparatus followed by one or more downstream pressure driven separation apparatus and/or distillation units. The advanced water conditioning system utilized in aspects and embodiments disclosed herein may produce demineralized or deionized water meeting a desired specification for purity or ionic content. The demineralized or deionized water produced in the advanced water conditioning system from, for example, water from a source of potable water, may have a resistivity of at least 50 kΩ-cm, at least 1 megaohm-cm, at least 10 megaohm-cm, or at least 20 megaohm-cm.

Aspects and embodiments of an advanced water conditioning process and system as disclosed herein can also entail dilution of conditioned water with water from another water source, for example, potable water, to add some alkalinity to the conditioned water blend.

Figure 2:
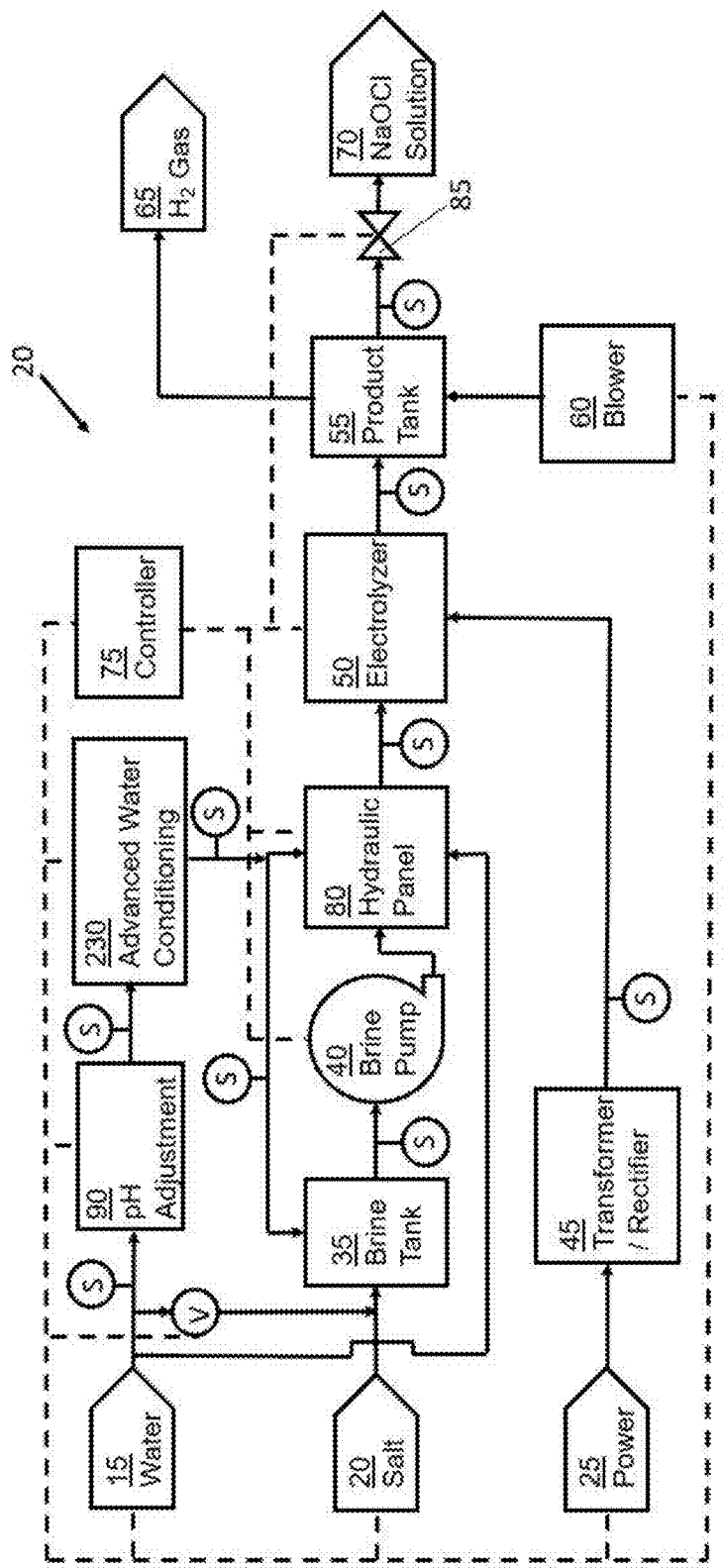
FIG. 2 illustrates a configuration of another embodiment of a brine electrochlorination system.

In accordance with one embodiment, the electrochlorination system 10 of FIG. 1 may be modified to include an advanced water conditioning system 230 as illustrated in the electrochlorination system 20 of FIG. 2. All other unit operations and subsystems of the electrochlorination system 20 of FIG. 2 having same reference numbers as those of the electrochlorination system 10 of FIG. 1 may operate as discussed above with respect to the electrochlorination system 10 of FIG. 1.

The electrochlorination system 20 of FIG. 2 may additionally include a hydraulic panel 80 to control flow of deionized or demineralized dilution water from the advanced water conditioning system 230 to mix with the concentrated brine from the brine pump 40 as well as a flow rate of concentrated brine from the brine pump 40, and a flow of dilution water from another source, for example, source of water 15, to achieve a desired dilution ratio and concentration of brine to be provided to the inlet of the electrolyzer.

An emergency shut-off valve 85 may be provided between the product tank 55 and product outlet 70 or storage system or point of use to shut off flow of sodium hypochlorite solution should the solution not meet specifications for one or more parameters as discussed in further detail below.

A pH adjustment system 90 may be provided between the source of water 15 and the advanced water conditioning system 230 to adjust the pH of the water from the source of water to a level that will reduce the production of chlorate in the electrolyzer 50. The pH adjustment system 90 may alternatively be disposed downstream of an outlet of the advanced water conditioning system 230 or within and part of the advanced water conditioning system 230 and may be used to maintain or adjust the pH of water from the source of water 15 after it is deionized or demineralized by one or more unit operations of the advanced water conditioning system 230. The pH adjustment system may include a source of an acid, for example, sulfuric acid or hydrochloric acid and/or a source of caustic, for example, sodium hydroxide, and associated metering valves, pumps, and pH and/or flow rate sensors. The pH adjustment system 90 may dose the water from the source of water 15 and/or deionized or demineralized water produced in the advanced water conditioning system 230 under control of the controller 75 responsive to pH measurements by one or more sensors S of the pH of a fluid stream, for example, the water from the source of water 15 or diluted brine to be introduced into the electrolyzer 50 to maintain or adjust the pH of the fluid stream to be introduced into the electrolyzer to a pH of between about 6 and about 10, a pH of about 7 and about 9, or a pH of about 8.

The hydraulic panel 80, emergency shut-off valve 85, and pH adjustment system may be in wired or wireless communication with the controller 75 and operate in accordance with control signals from the controller 75.

In one embodiment, a demineralization or deionization apparatus included in or making up the advanced water conditioning system 230 is used to provide deionized or demineralized water to the brine tank 35 to mix with salt from the source of salt 20 to form the concentrated brine solution in the brine tank 35 or to be introduced into the brine tank 35. In other embodiments water from a source of potable water, for example, source of water 15, may additionally or alternatively be used to mix with salt from the source of salt 20 to form concentrated brine in the brine tank 35 or to be introduced into the brine tank 35. A valve V under control of the controller 75 may control flow of water from the source of water 15 to mix with salt from the source of salt 20 to form the concentrated brine. The concentration of NaCl in the concentrated brine in the brine tank 35 may be at or near saturation at 26 wt % in water, although it should be understood that the saturation concentration of NaCl in the concentrated brine may vary based on the temperature of the concentrated brine, for example, between 22 wt % (or 22 g/L) and 30 wt % (or 30 g/L). This concentrated brine solution is diluted with demineralized water from the advanced water conditioning system 230, and optionally with non-deionized, non-demineralized, or potable water, for example, water from the source of water 15, and introduced to the electrolyzer 50. The dilution factor may be in the range of 8:1 to 16:1 dilution water to concentrated brine. A source of electric power is applied to the anode(s) and cathode(s) of the electrolyzer 50. The final concentration of sodium hypochlorite in the sodium hypochlorite solution from the electrolyzer 50 may be between about 0.5 wt % and about 1.0 wt %, between about 0.7 wt % and about 0.9 wt % or approximately 0.8% wt %. Chlorate may be present in the sodium hypochlorite solution from the electrochlorination unit at a concentration of 0.25 mg/L or less, 15 mg/L or less, or 10 mg/L or less.

Figure 3A:
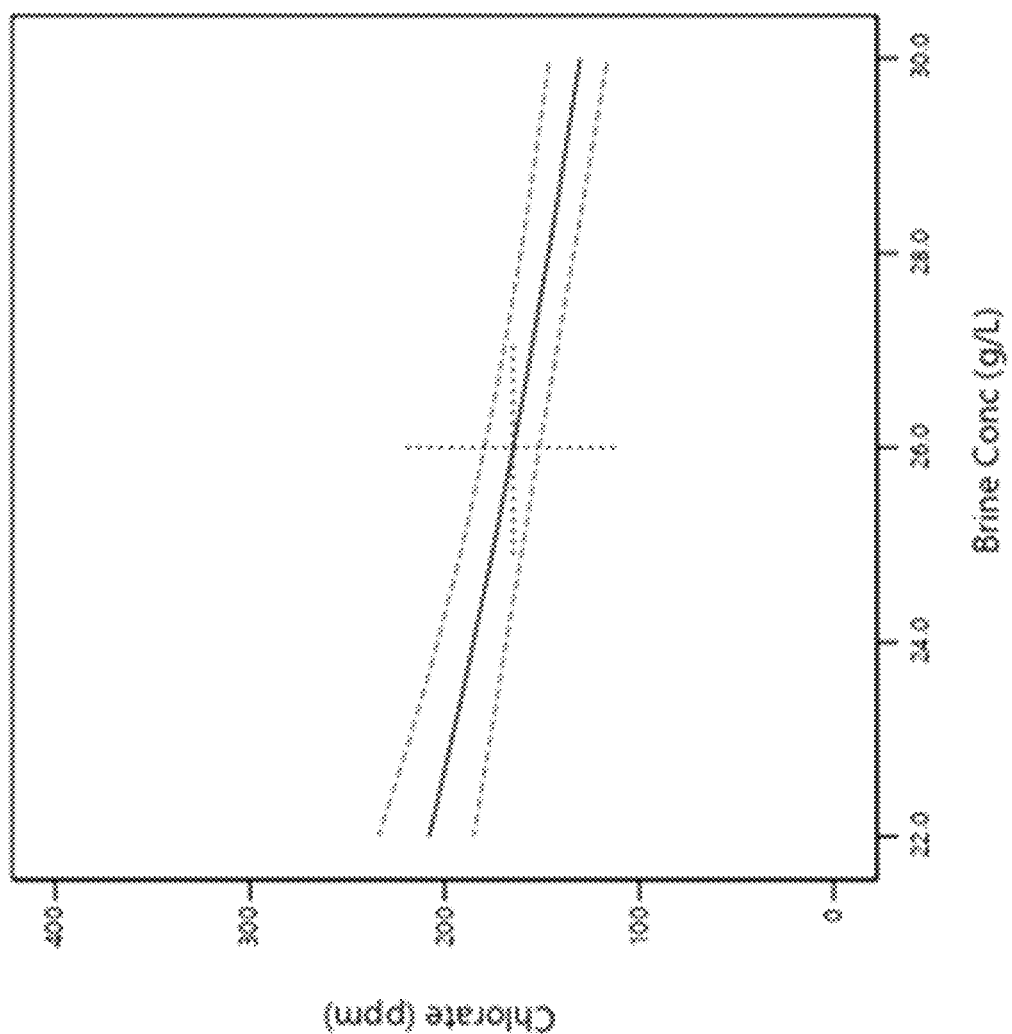
FIG. 3A illustrates the effect of concentration of brine solution on chlorate concentration in product output from an electrolyzer of a brine electrochlorination system.

Testing performed to evaluate various operating parameters on the concentration of chlorate in the sodium hypochlorite solution produced by an electrolyzer in a brine electrochlorination system configured as illustrated in FIG. 2. A first operating parameter that was investigated was the NaCl concentration of brine solution introduced into the electrolyzer. FIG. 3A illustrates the effect of this parameter on chlorate concentration in the produced hypochlorite solution when the system was operated with a current density across the anode and cathode plates of the electrolyzer of 1.2 A/in$^2$, a temperature of the brine introduced into the electrolyzer of 17.5° C., and a flow rate of the brine introduced into the electrolyzer of 3.45 gallons per hour. The dashed lines in the chart of FIG. 3A as well as those in FIGS. 3B-3D indicate the 95% confidence interval for the plotted data. As can be seen from FIG. 3A the chlorate concentration decreased with increasing NaCl concentration of the brine solution introduced into the electrolyzer at tested concentrations up to 30 g/L.

Figure 3B:
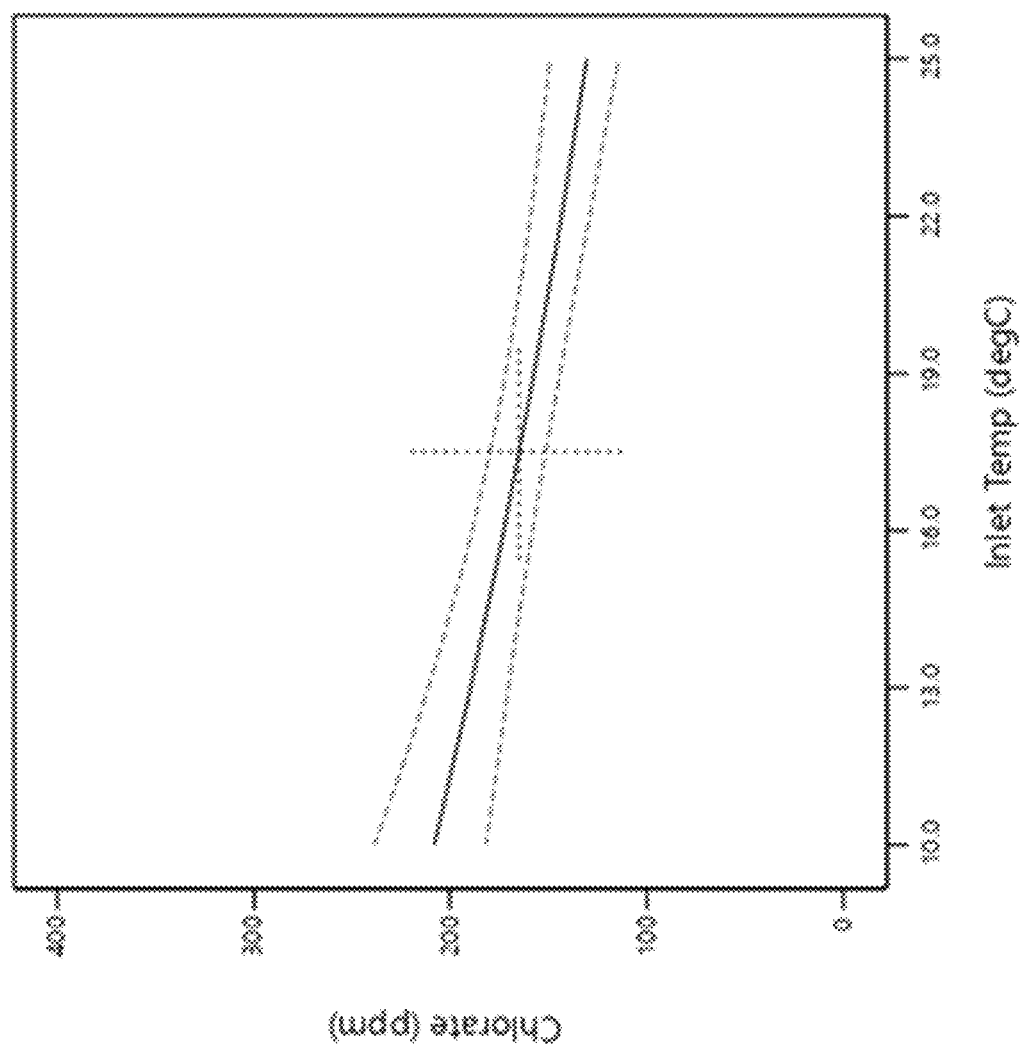
FIG. 3B illustrates the effect of brine solution temperature on chlorate concentration in product output from an electrolyzer of a brine electrochlorination system.

A second operating parameter that was investigated was temperature of the brine solution introduced into the electrolyzer. FIG. 3B illustrates the effect of this parameter on chlorate concentration in the produced hypochlorite solution when the system was operated with a current density across the anode and cathode plates of the electrolyzer of 1.2 A/in$^2$, a NaCl concentration of 26 g/L in the brine introduced into the electrolyzer, and a flow rate of the brine introduced into the electrolyzer of 3.45 gallons per hour. As can be seen from FIG. 3B the chlorate concentration decreased with increasing temperature of the brine solution introduced into the electrolyzer at tested temperatures up to 25° C.

Figure 3C:
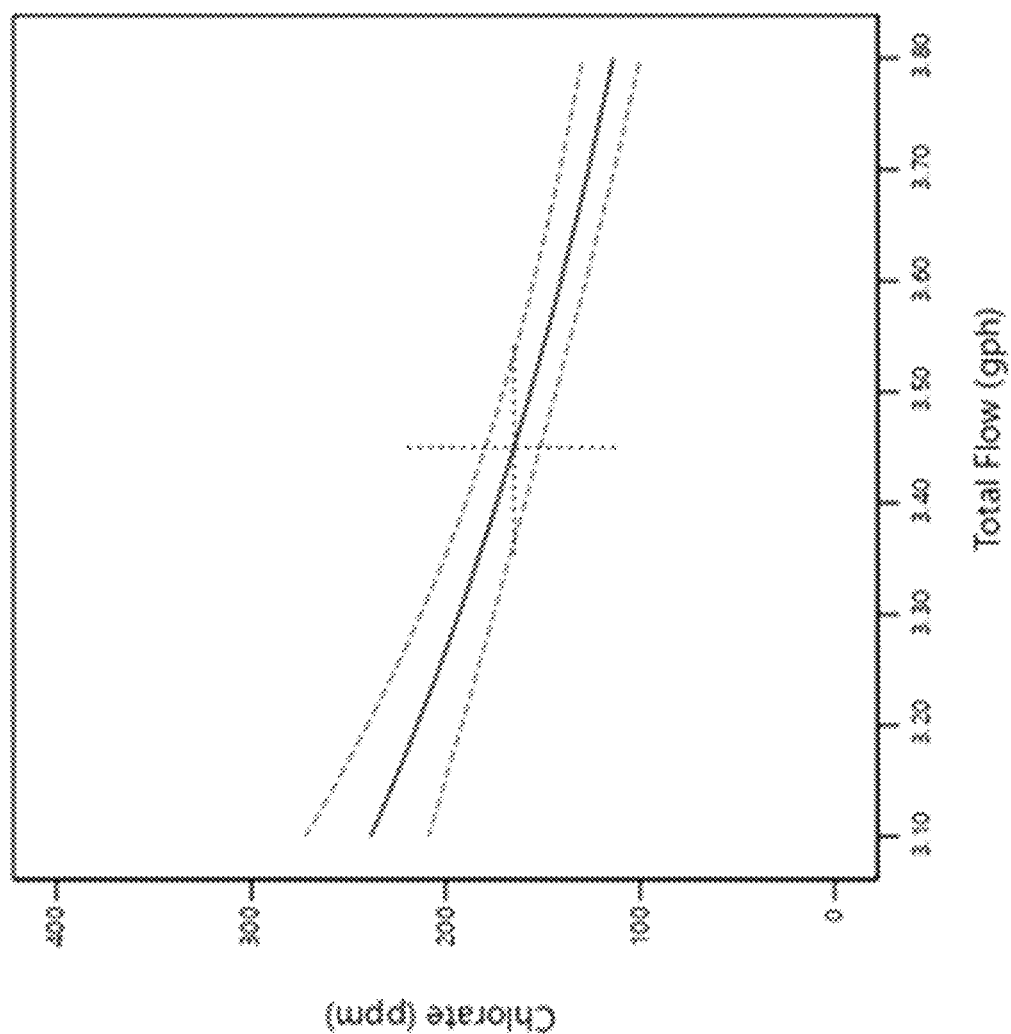
FIG. 3C illustrates the effect of brine solution flow rate on chlorate concentration in product output from an electrolyzer of a brine electrochlorination system.

A third operating parameter that was investigated was flow rate of a brine solution through the electrolyzer. FIG. 3C illustrates the effect of this parameter on chlorate concentration in the produced hypochlorite solution when the system was operated with a current density across the anode and cathode plates of the electrolyzer of 1.2 A/in$^2$, a NaCl concentration of 26 g/L in the brine introduced into the electrolyzer, and a temperature of the brine introduced into the electrolyzer of 17.5° C. As can be seen from FIG. 3C the chlorate concentration decreased with increasing flow rate of the brine solution through the electrolyzer at tested flow rates up to 3.8 gallons per hour.

Figure 3D:
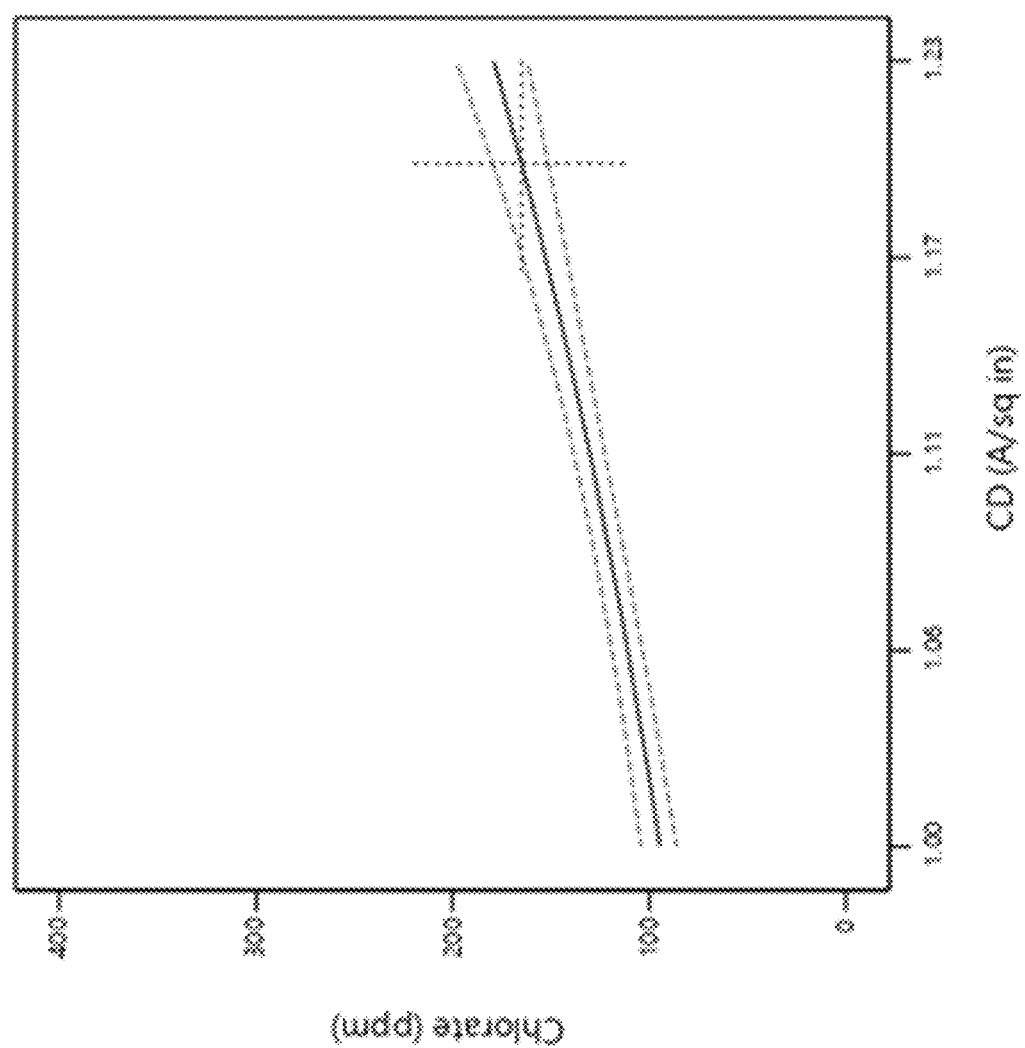
FIG. 3D illustrates the effect of current density applied to electrode plates of an electrolyzer on chlorate concentration in product output from an electrolyzer of a brine electrochlorination system.

A fourth operating parameter that was investigated was current across the anode and cathode plates of the electrolyzer. FIG. 3D illustrates the effect of this parameter, expressed as A/in$^2$ of electrode area on chlorate concentration in the produced hypochlorite solution when the system was operated with a NaCl concentration of 26 g/L in the brine introduced into the electrolyzer, flow rate of the brine introduced into the electrolyzer of 3.45 gallons per hour, and a temperature of the brine introduced into the electrolyzer of 17.5° C. As can be seen from FIG. 3D the chlorate concentration increased with increasing electrode current density at tested current densities between 1.00 A/in$^2$ and 1.23 A/in$^2$.

In view of the test results discussed above, in some embodiments, the sensors S and controller 75 of the electrochlorination system 20 may monitor and operate the sources of salt 20 and water 15 to introduce salt and water into the brine tank 35 and the rate of addition of dilution water to control or maintain the sodium chloride concentration of the brine solution introduced into the electrolyzer between about 22 g/L and about 30 g/L, between about 24 g/L and about 28 g/L, between about 25 g/L and about 27 g/L, or about 26 g/L prior to dilution.

The sensors S and controller 75 of the electrochlorination system 20 may operate to control or maintain the temperature of the diluted brine solution introduced into the electrolyzer between about 10 degrees Celsius and about 30 degrees Celsius, between about 13 degrees Celsius and about 25 degrees Celsius, between about 16 degrees Celsius and about 22 degrees Celsius, or at about 20 degrees Celsius.

The sensors S and controller 75 of the electrochlorination system 20 may operate to control or maintain the flow rate of the diluted brine solution introduced into the electrolyzer at a flow rate of between about 3.2 gallons per hour and about 3.8 gallons/hour, between about 3.4 gallons per hour and about 3.8 gallons/hour, between about 3.6 gallons per hour and about 3.8 gallons/hour, or at about 3.7 gallons per hour. The sensors S and controller 75 of the electrochlorination system 20 may operate to control or maintain the flow rate of the diluted brine solution introduced into the electrolyzer at a flow rate of 10-25 gallons per pound of generated chlorine, equivalent in a ratio flow rates of 8:1 to 13:1 dilution water to brine concentration flows.

The sensors S and controller 75 of the electrochlorination system 20 may operate to control or maintain the power supplied to the electrolyzer to cause the electrolyzer to exhibit a current density of between about 1.06 amp/in$^2$ of electrode area and about 1.23 amp/in$^2$ of electrode area, a current density of between about 1.08 amp/in$^2$ of electrode area and about 1.21 amp/in$^2$ of electrode area, a current density of between about 1.11 amp/in$^2$ of electrode area and about 1.20 amp/in$^2$ of electrode area, or a current density of about 1.20 amp/in$^2$ of electrode area.

Figure 4:
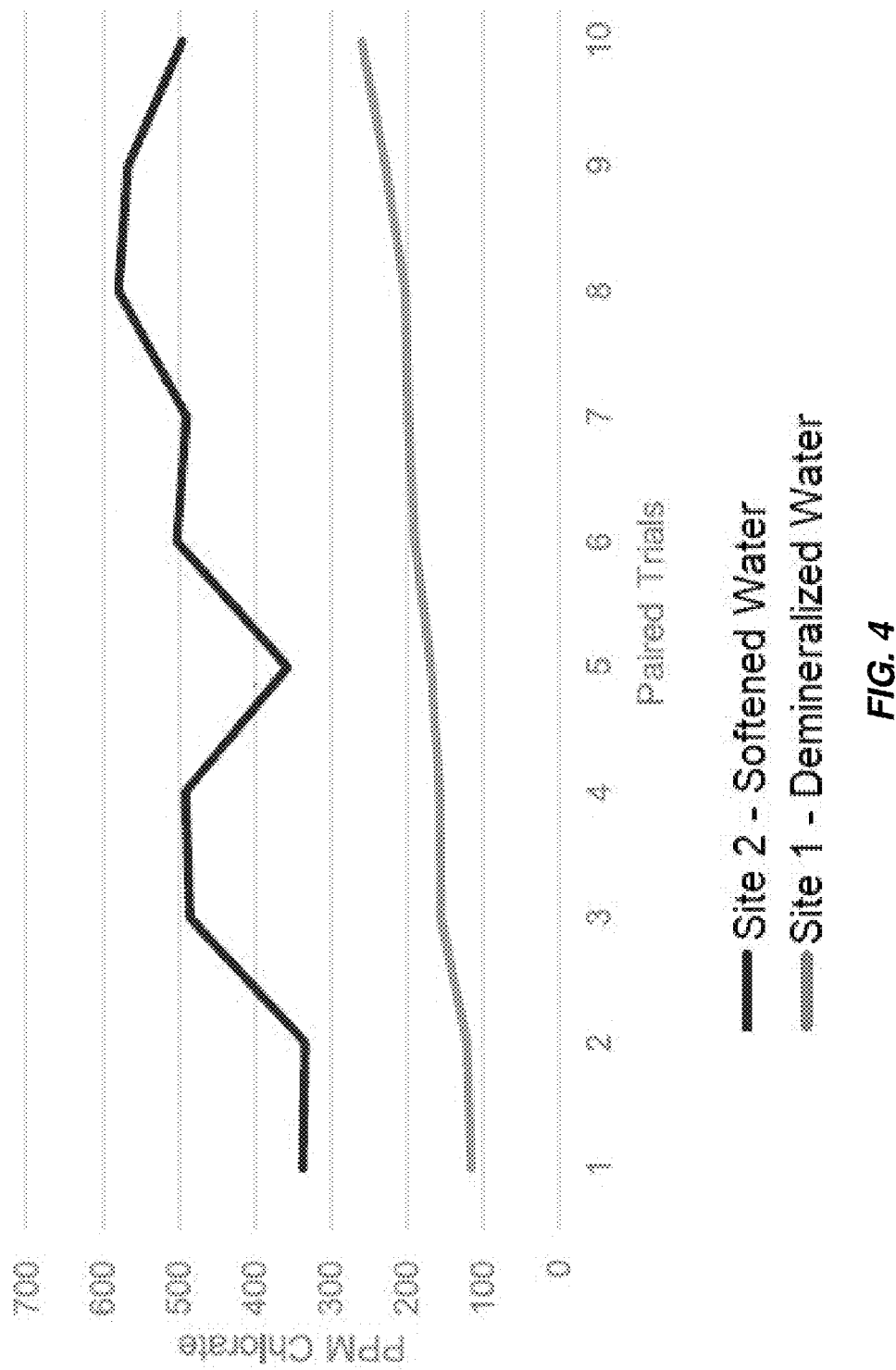
FIG. 4 shows results of testing of chlorate content of a hypochlorite solution produced in a brine electrochlorination system when using either softened or demineralized water.

FIG. 4 shows test data of the chlorate content of the hypochlorite solution when using both softened and demineralized water. It is apparent that the hypochlorite solution has a substantial lower chlorate concentration when using demineralized water compared to using softened water for the water mixed with salt to form brine and the dilution water. The graph in FIG. 4 shows the results of many tests using demineralized or softened water, where one of five variables were changed for the different paired tests. These variables include dilution water flow rate, brine flow rate, temperature, current density, and electrolyzer electrode configuration. In all cases, using demineralized water proved to yield a lower chlorate concentration compared to softened water.

Figure 5A:
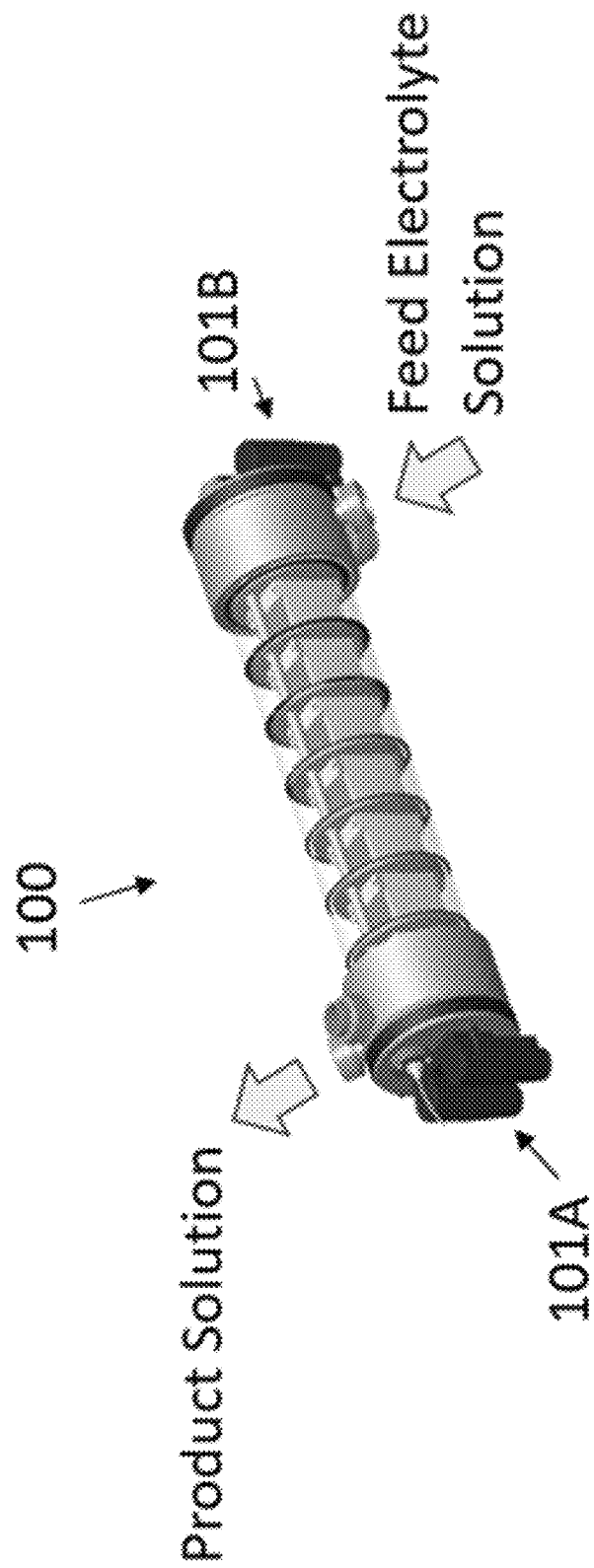
FIG. 5A is an isometric view of an embodiment of an electrochemical cell.
Figure 5B:
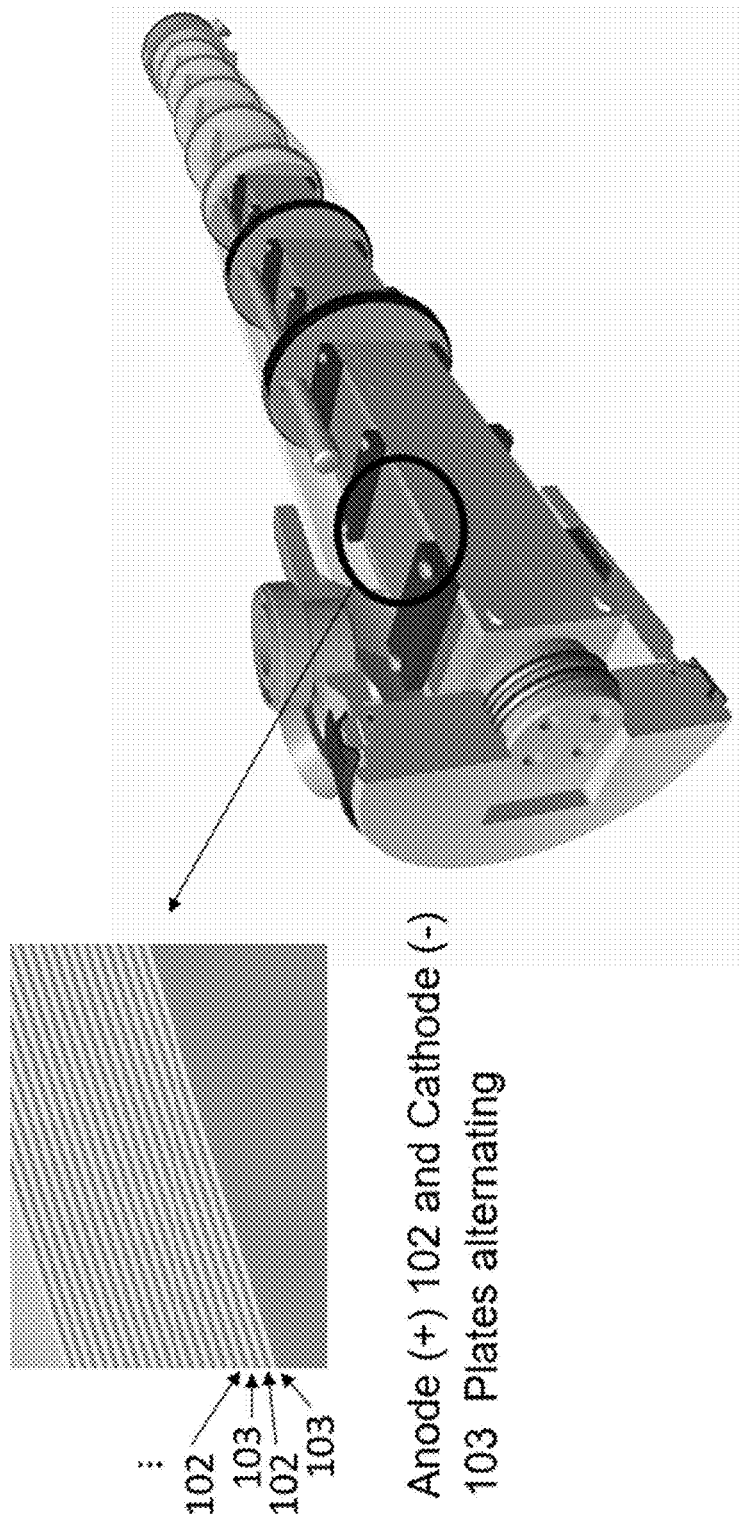
FIG. 5B is a view of the electrochemical cell of FIG. 5A with the housing removed to illustrate the anode and cathode plates.
Figure 5C:
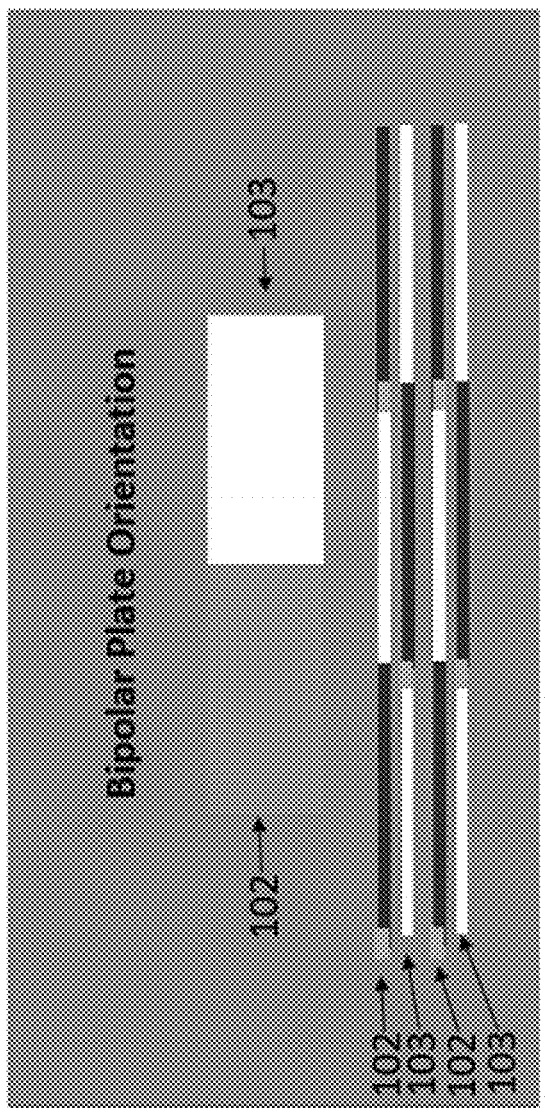
FIG. 5C illustrates a bipolar plate orientation for an electrochemical cell.

FIGS. 5A, 5B, and 5C show an example of an electrochemical cell 100 manufactured by Evoqua Water Technologies LLC. which may be utilized as an electrolyzer in various aspects and embodiments disclosed herein. The electrochemical cell 100 includes bi-polar electrode plates, as shown in FIG. 5C that have a cathode 102 and anode 103 face. Theses electrode plates are the active electrode areas. The gap between the electrodes is approximately 1 mm. These electrolyzer cells 100 are designed for continuous flow. Brine is pumped at the front end of the cell and flows through an arrangement of vertical plates (anodes 103 and cathodes 102). As brine advances through the cell, hypochlorite and hydrogen are formed. At the back end of the cell, hydrogen is removed and hypochlorite collected.

Other electrochemical cells including spiral wound, concentric, radially arranged, and interleaved electrodes and methods of electrochemically generating compounds such as sodium hypochlorite in same that may be utilized in conjunction with the embodiments disclosed herein are described in further detail in commonly owned PCT application PCT/US2016/018213, Publication No. WO2016133983 which is incorporated in its entirety herein by reference. Undivided parallel plate monopolar, undivided parallel plate bi-polar, and membrane cell designs may also be utilized as electrolyzers in conjunction with embodiments disclosed herein.

Various additional pumps or valves may be included in any of the systems described above to control flow of the various aqueous solutions involved but are not illustrated for the purpose of clarity.

Aspects and embodiments disclosed herein provide for control and optimization of operating conditions for on-site electrochlorination system such as illustrated in FIG. 2 for chlorate formation reduction. This is done by collecting and analyzing operating parameters, via sensors throughout the system, for example, sensors S illustrated in FIG. 2, and an embedded algorithm to predict the chlorate formation in the electrolyzer process. Based on specified limits of chlorate and performance efficiencies (for example, power consumption per pound of chlorine equivalent, salt consumption per pound of chlorine equivalent, or water consumption per pound of chlorine equivalent), the controller of the system will send out signals to modify operating conditions of the various unit operations of the system to reduce the levels of chlorates, based on variable conditions, such as time, inlet water quality, salt quality, etc. If the system is approaching the limits of operation it can alert a user, via an alarm, that it may fault. If intervention is not provided in time, the system may shut down. The shutdown process may include closing a safety shutoff valve at the outlet of the product tank, for example, emergency shut-off valve 85 illustrated in FIG. 2, to ensure no high chlorate level sodium hypochlorite reaches the product outlet 70 or point of use for the product sodium hypochlorite solution. The control and optimization functions may be performed by a controller of the system, for example, controller 75 illustrated in FIG. 2.

Figure 6:
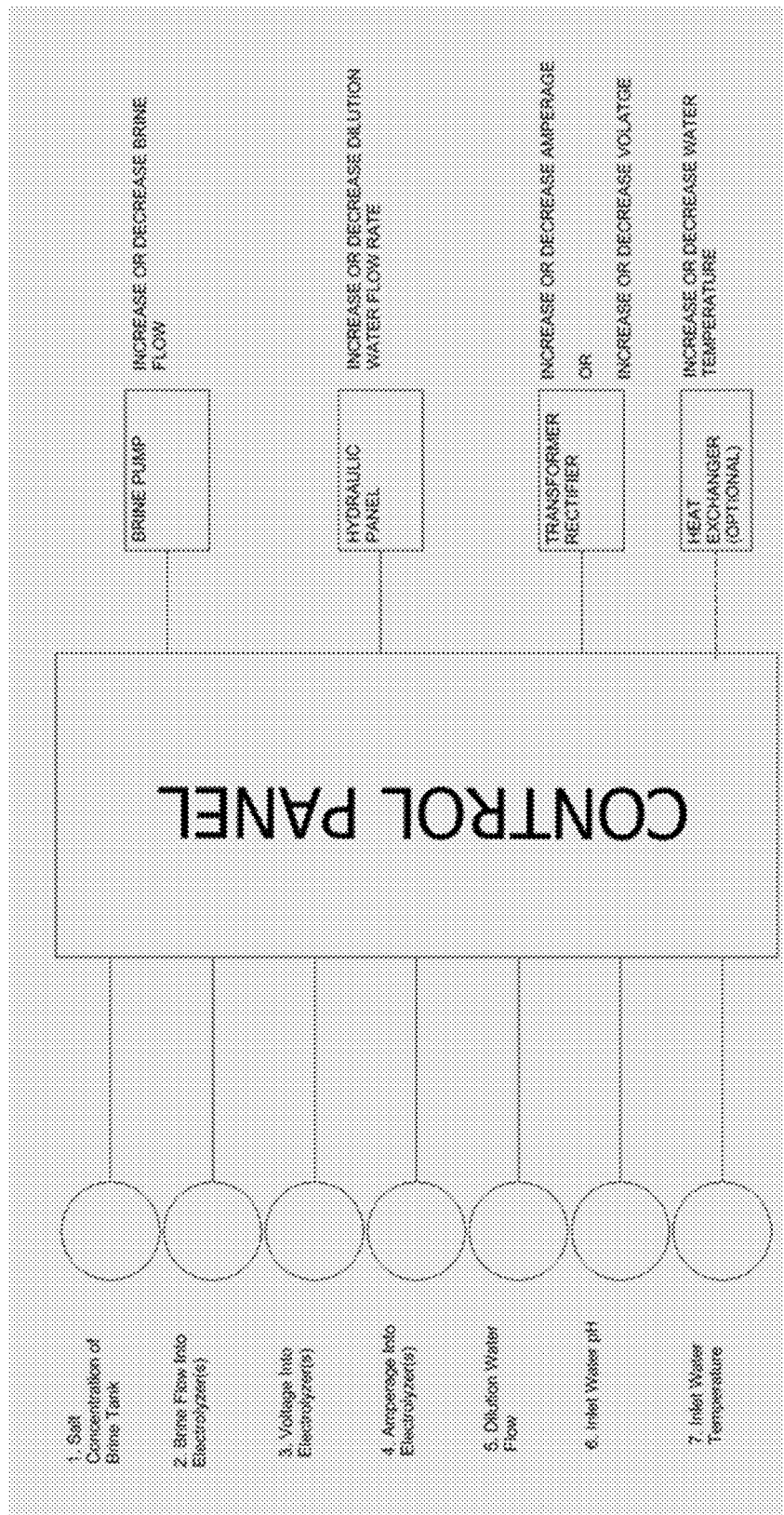
FIG. 6 illustrates input and output parameters used to control operation of an electrochlorination system as disclosed herein.

The integrated control logic for on-site sodium hypochlorite generators will reduce or minimize chlorate formation and ultimately the chlorate to chlorine equivalency ratio, by monitoring and optimizing adjustments of at least the following operating parameters:
  1. Salt Concentration of Brine in Brine Tank
  2. Brine Flow Rate Into Electrolyzer(s)
  3. Voltage Into Electrolyzer(s)
  4. Amperage Into Electrolyzer(s)
  5. Dilution Water Flow Rate
  6. Inlet Water pH
  7. Inlet Water Temperature The following limit conditions will be entered into the controller:
  Chlorine equivalency concentration
  Power consumption/pound (or kg) of chlorine equivalency generated per hour
  Salt consumption/pound (or kg) of chlorine equivalency generated per hour Therefore, the control inputs and outputs, specifically for chlorate mitigation optimization would be as illustrated in FIG. 6, where the illustrated control panel may be an embodiment of the controller 75 illustrated in FIG. 2. The control inputs are illustrated on the left in FIG. 6 and the control outputs illustrated on the right. The various control inputs may be provided to the controller 75 by the various sensors S as illustrated in FIG. 2.

Given the physical design set up of the given on-site sodium hypochlorite generator, not all of the parameters may be monitored or optimized. The control logic is dynamically driven to find optimization based on the available operating conditions from this field.

The system may have alarms based on the customer specified limit conditions. The system will go into alarm, issuing a warning as operating conditions are approaching limits. As the detected sensor values cross their respective thresholds it will drive the unit to shut down, triggering a shutoff alarm. An added feature of control may include a safety shut off valve 85 disposed between the outlet of the product tank 55 and the product outlet 70 or a dosing pump included in a point of use used to feed the produced sodium hypochlorite solution. This safety feature will prevent dosage of hypochlorite, when the believed chlorate values in the hypochlorite product solution are above the safety/specified limits. If shutoff of the system is initiated, the customer of the system can manually evaluate the chlorate concentration in the sodium hypochlorite product solution and resume operation of the system if the concentration is within an acceptable range. If the chlorate concentration in the product solution is above acceptable limits, the product tank 55 can be purged and the electrochlorination unit reset to ideal operating conditions, without ever dosing sodium hypochlorite with chlorate levels above the specified threshold to the point of use.

The control logic will be able to provide a predicted chlorate concentration in the product solution based on the measured operating parameters of the system. The predictive effects of various operating parameters on the chlorate formation are illustrated above in FIGS. 3A-3D. The control logic may be initially calibrated on site, and then used to set alarms or control limits for the various operating parameters to ensure that the chlorate values remain below the predetermined threshold as shown in FIG. 7 and FIG. 8. FIG. 7 illustrates a simple control screen example of operating parameters (not inclusive of all options) for a controller to allow the user to manually adjust the operating conditions. FIG. 8 shows the predicted values based on the inputs from FIG. 7. These predicted values will help drive the user, or a controller of the system, to optimize the performance of the units to reduce chlorate formation, while maintaining key performance metrics. This predictive ability can be enhanced, when introducing a "control factor". This factor can be optimized by adding in real time recoded chlorate data from the location in which the system is installed. This will allow the control logic to become more refined in its approach and provide greater accuracy.

Figure 9:
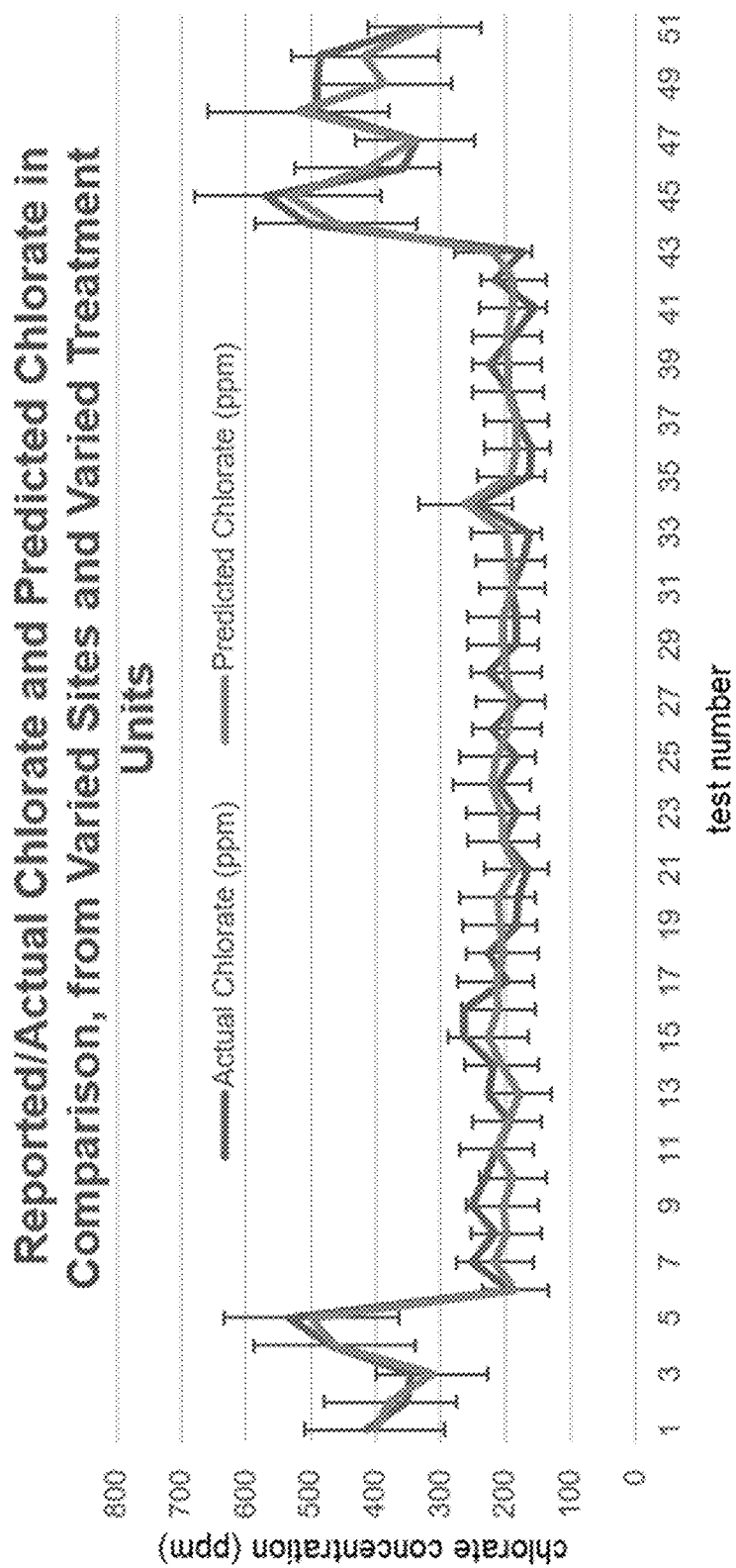
FIG. 9 illustrates predicted versus observed chlorate concentrations in product of an electrochlorination system as disclosed herein.

In one example, testing an algorithm as disclosed herein in three different trial locations resulted in the predicative vs. actual results illustrated in FIG. 9. There was a good agreement between predicted and actual chlorate concentrations in the product solution, with all actual measured values falling within the illustrated 95% confidence limit error bars for the predicted values.

Figure 10B:
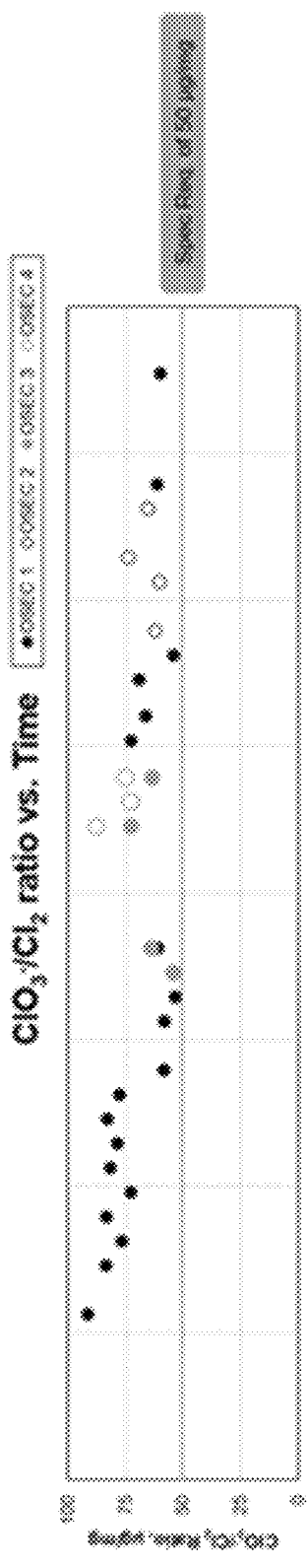
FIG. 10B illustrates chlorate concentrations in product of the electrolyzer of the example electrochlorination system described with reference to FIG. 10A prior to optimization of the operating parameters of FIG. 10A.
Figure 10C:
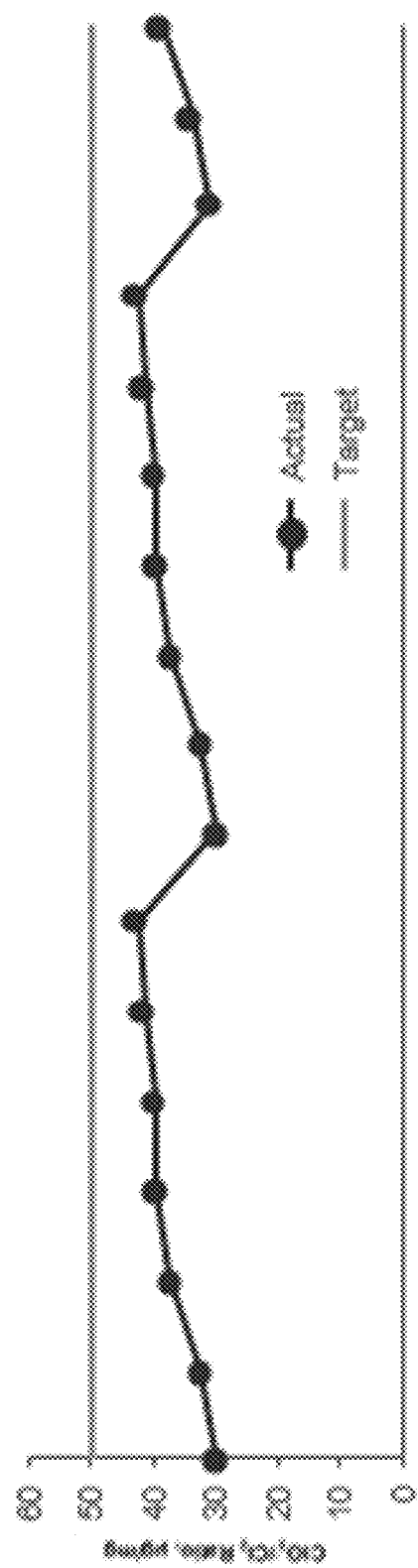
FIG. 10C illustrates chlorate concentrations in product of the electrolyzer of the example electrochlorination system described with reference to FIG. 10A after optimization of the operating parameters of FIG. 10A.

Another example of optimizing operating parameters of an electrochlorination system is illustrated in FIGS. 10A-10C. FIG. 10A illustrates the values of various operating parameters of the system before optimization (the "Standard" values) and after optimization (the Suggested Guidelines"). FIG. 10B illustrates chlorate concentration in the product stream from the system prior to optimization of the operating parameters and FIG. 10C illustrates chlorate concentration in the product stream from the system after optimization of the operating parameters. A significant reduction in chlorate concentration was observed.

As discussed above, in one or more embodiments, any of which may be relevant to one or more aspects, the systems and techniques disclosed herein may utilize one or more subsystems that adjusts or regulates or at least facilitates adjusting or regulating at least one operating parameter, state, or condition of at least one unit operation or component of the system or one or more characteristics or physical properties of a process stream. To facilitate such adjustment and regulatory features, one or more embodiments may utilize controllers and indicative apparatus that provide a status, state, or condition of one or more components or processes. For example, at least one sensor may be utilized to provide a representation of an intensive property or an extensive property of, for example, water from the advanced water conditioning system 230 or water or brine entering or leaving the brine tank 35 or electrolyzer 50. Thus, in accordance with a various embodiments, the systems and techniques may involve one or more sensors or other indicative apparatus, such as composition analyzers, flow sensors, pH monitors, conductivity cells, etc. that provide, for example, a representation of a state, condition, characteristic, or quality of the water, brine, or product solution entering or leaving any of the unit operations of the system.

Various operating parameters of the electrochlorination systems disclosed herein may be controlled or adjusted by an associated control system or controller based on various parameters measured by various sensors located in different portions of the systems. The controller may be programmed or configured to regulate the various operating parameters discussed with respect to FIG. 6 based at least on one or more of the input parameters indicated in FIG. 6. The controller may be programmed or configured to regulate introduction of brine, flow rates of brine and/or dilution water and power applied to the electrolyzer, among other operating parameters based on measured measure flow rates, temperatures, pH levels, dissolved solids or salt concentration levels, etc. of any of the fluid streams throughout the system.

The controller may be programmed or configured to regulate one or more of a current across the anode-cathode pair or a voltage applied across the anode-cathode pair of the electrolyzer based on a flow rate, temperature, pH, or concentration of brine to be introduced into the electrolyzer or based on a desired concentration of sodium hypochlorite or chlorate in the product solution exiting the electrolyzer.

The controller used for monitoring and controlling operation of the various elements of systems disclosed herein, for example, controller 75 illustrated in FIG. 2 may include a computerized control system. Various aspects of the controller may be implemented as specialized software executing in a general-purpose computer system 200 such as that shown in FIG. 11. The computer system 200 may include a processor 202 connected to one or more memory devices 204, such as a disk drive, solid state memory, or other device for storing data. Memory 204 is typically used for storing programs and data during operation of the computer system 200. Components of computer system 200 may be coupled by an interconnection mechanism 206, which may include one or more busses (e.g., between components that are integrated within a same machine) and/or a network (e.g., between components that reside on separate discrete machines). The interconnection mechanism 206 enables communications (e.g., data, instructions) to be exchanged between system components of system 200. Computer system 200 also includes one or more input devices 208, for example, a keyboard, mouse, trackball, microphone, touch screen, and one or more output devices 210, for example, a printing device, display screen, and/or speaker.

The output devices 210 may also comprise valves, pumps, or switches which may be utilized to regulate or maintain flows of the various fluid streams of systems as disclosed herein. One or more sensors 214 may also provide input to the computer system 200. These sensors may include, for example, sensors S illustrated in FIG. 2 which may be, for example, pressure sensors, chemical concentration sensors, temperature sensors, pH sensors, flow rate sensors, voltage sensors, current sensors, or sensors for any other parameters of interest to the systems disclosed herein. These sensors may be located in any portion of the system where they would be useful, for example, upstream or downstream of any of the source of water 15, pH adjustment system 90, advanced water conditioning system 230, brine tank 35, hydraulic panel 80, electrolyzer 50, product tank 55, or power source 25 or transformer/rectifier 45. In addition, computer system 200 may contain one or more interfaces (not shown) that connect computer system 200 to a communication network in addition or as an alternative to the interconnection mechanism 206.

Figure 12:
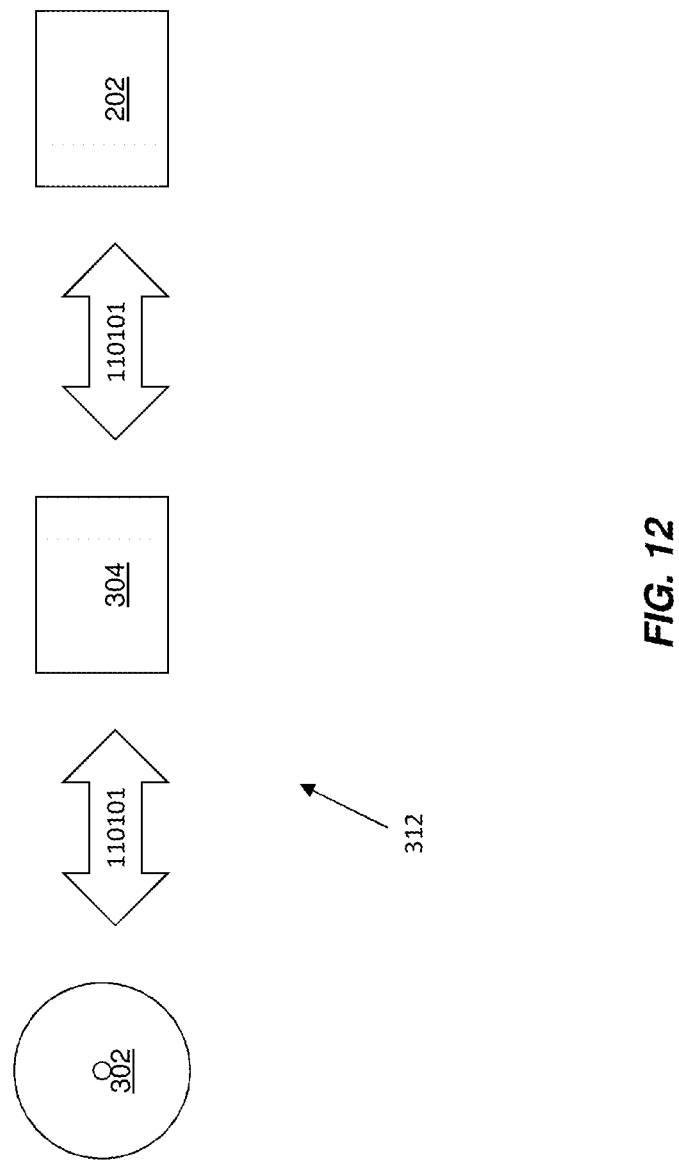
FIG. 12 illustrates a memory system for the control system of FIG. 11.

The storage system 212, shown in greater detail in FIG. 12, typically includes a computer readable and writeable nonvolatile recording medium 302 in which signals are stored that define a program to be executed by the processor 202 or information to be processed by the program. The medium may include, for example, a disk or flash memory. Typically, in operation, the processor causes data to be read from the nonvolatile recording medium 302 into another memory 304 that allows for faster access to the information by the processor than does the medium 302. This memory 304 is typically a volatile, random access memory such as a dynamic random access memory (DRAM) or static memory (SRAM). It may be located in storage system 212, as shown, or in memory system 204. The processor 202 generally manipulates the data within the integrated circuit memory 304 and then copies the data to the medium 302 after processing is completed. A variety of mechanisms are known for managing data movement between the medium 302 and the integrated circuit memory element 1604, and aspects and embodiments disclosed herein are not limited thereto. Aspects and embodiments disclosed herein are not limited to a particular memory system 204 or storage system 212.

The computer system may include specially-programmed, special-purpose hardware, for example, an application-specific integrated circuit (ASIC). Aspects and embodiments disclosed herein may be implemented in software, hardware or firmware, or any combination thereof. Further, such methods, acts, systems, system elements and components thereof may be implemented as part of the computer system described above or as an independent component.

Figure 11:
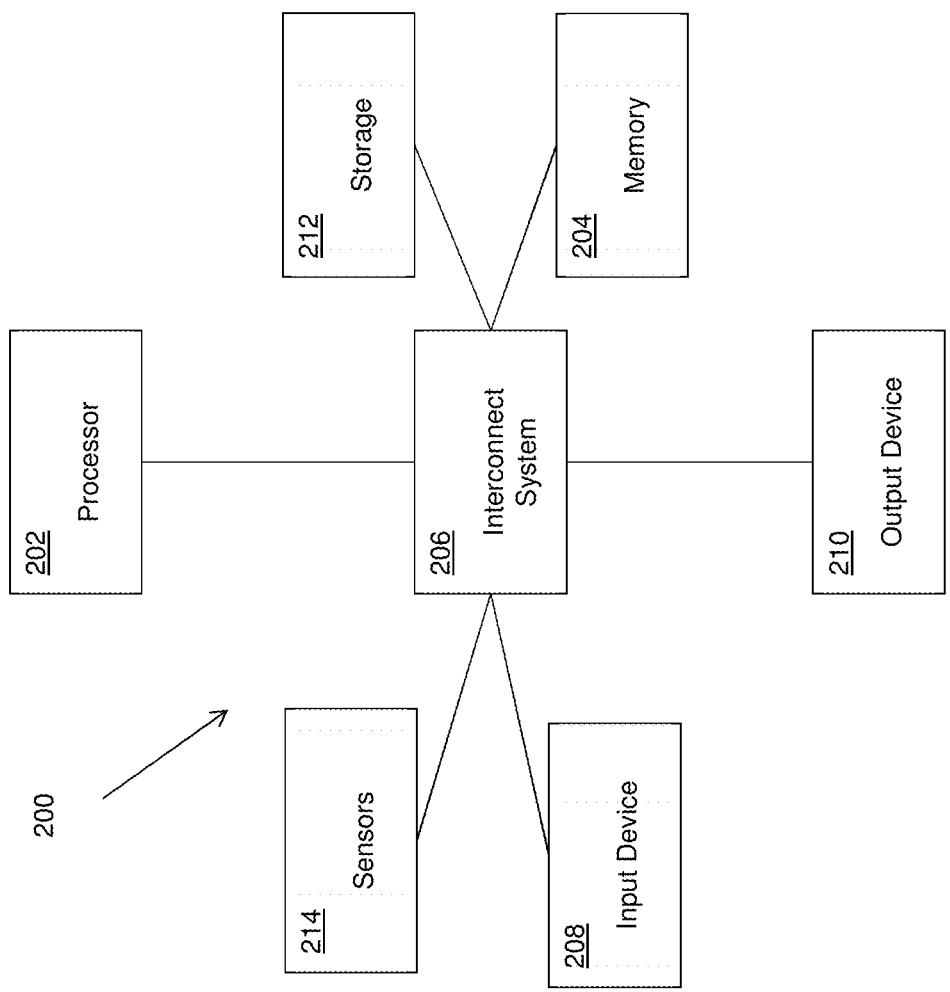
FIG. 11 illustrates a control system that may be utilized for embodiments of electrochlorination systems disclosed herein.

Although computer system 200 is shown by way of example as one type of computer system upon which various aspects and embodiments disclosed herein may be practiced, it should be appreciated that aspects and embodiments disclosed herein are not limited to being implemented on the computer system as shown in FIG. 11. Various aspects and embodiments disclosed herein may be practiced on one or more computers having a different architecture or components than shown in FIG. 11.

Computer system 200 may be a general-purpose computer system that is programmable using a high-level computer programming language. Computer system 200 may be also implemented using specially programmed, special purpose hardware. In computer system 200, processor 202 is typically a commercially available processor such as the well-known Pentium™ or Core™ class processors available from the Intel Corporation. Many other processors are available, including programmable logic controllers. Such a processor usually executes an operating system which may be, for example, the Windows 7, Windows 8, or Windows 10 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that aspects and embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects and embodiments disclosed herein may be performed on a client-server system that includes components distributed among one or more server systems that perform various functions according to various aspects and embodiments disclosed herein. These components may be executable, intermediate (e.g., IL) or interpreted (e.g., Java) code which communicate over a communication network (e.g., the Internet) using a communication protocol (e.g., TCP/IP). In some embodiments one or more components of the computer system 200 may communicate with one or more other components over a wireless network, including, for example, a cellular telephone network.

It should be appreciated that the aspects and embodiments disclosed herein are not limited to executing on any particular system or group of systems. Also, it should be appreciated that the aspects and embodiments disclosed herein are not limited to any particular distributed architecture, network, or communication protocol. Various aspects and embodiments disclosed herein are may be programmed using an object-oriented programming language, such as SmallTalk, Java, C++, Ada, or C# (C-Sharp). Other object-oriented programming languages may also be used. Alternatively, functional, scripting, and/or logical programming languages may be used, for example, ladder logic. Various aspects and embodiments disclosed herein may be implemented in a non-programmed environment (e.g., documents created in HTML, XML or other format that, when viewed in a window of a browser program, render aspects of a graphical-user interface (GUI) or perform other functions). Various aspects and embodiments disclosed herein may be implemented as programmed or non-programmed elements, or any combination thereof.

In accordance with further aspects, an existing electrochlorination system may be retrofit to include any of the features of functionality of embodiments of the systems and methods disclosed herein. In one example, a method of retrofitting an electrochlorination system includes providing an advanced water conditioning system configured to remove anions, cations, and uncharged dissolved solids from water from a source of water and produce demineralized water, connecting an outlet of the advanced water conditioning system to a source of brine in fluid communication with an inlet of an electrolyzer of the system, and providing a controller of the electrochlorination system programmed to cause the electrochlorination system to mix the demineralized water with the brine and operate the electrolyzer under conditions sufficient to generate a sodium hypochlorite solution having a concentration of chlorate of less than 0.25 mg/L. It should be understood that the term "providing a controller" may include either providing a new controller for the existing system or reprogramming an existing controller of the existing system to include functionality as disclosed herein. The method of retrofitting the existing electrochlorination system may also include providing and/or installing a pH adjustment sub-system including a pH adjustment solution and metering valve or pump and configured to dose the water from the source of water with the pH adjustment system in an amount sufficient to maintain a pH of the water from the source of water at between about 9 and 11. Providing and/or installing the pH adjustment sub-system may include modifying an existing pH adjustment subsystem of the existing electrochlorination system and/or programming the controller to operate the pH adjustment subsystem to adjust or maintain the pH of the water from the source of water to be within a desired range. The method of retrofitting the existing electrochlorination system may also include installing a shut off valve downstream of the electrolyzer and programming the controller to cause the shut off valve to close responsive to a level of chlorate in the sodium hypochlorite solution being outside of an acceptable range.

Example

An OSEC® B-PLUS electrolyzer system (Evoqua Water Technologies) was commissioned at a test site. During the commissioning data were gathered to monitor the performance of the system.

Water softeners were provided for the electrochlorination system. Chillers were provided to ensure optimum conditions for the generation of sodium hypochlorite.

Chiller/Heat Exchanger criteria:
1) Maximum Inlet Water Temp.: 30° C.
2) Outlet Water Temp.: 18° C.
3) Water Flow Rate: match to electrolyser dilution water flow requirement.
4) Total heat exchanged: 71.9 kW (20.4 RT).

Electrolyzers were installed at a test site with the capacities stated in Table1 below. The electrolyzer system was controlled to operate efficiently and to regulate the concentration of the hypochlorite produced to 0.8% within a tolerance of ±0.2%. The concentration of the produced hypochlorite was kept at 0.8% (±0.04). The electrolyzer criteria are as follows: maximum salt requirement: 3.5 kg/kg of $Cl_2$ produced; and maximum energy consumption: 4.6 kWh (DC) per kg of $Cl_2$ produced.

TABLE 1

| Electrolyzers installed at test site | | |
|---|---|---|
| | Number | Unit Capacity |
| Electrolysers | 4 (3 Duty + 1 Standby) With space reserved for a two more standby units | 950 kg Free Cl/d |

The methods that were used to analyse the parameters are in Standard Methods for the Examination of Water and Wastewater; 21st Edition, 2005; published by APHA, AWWA and WEF and method references as follows: Chlorine residual 4500-Cl G; Chlorate (ASTM D6581); and Bromate 300-1(B) (Use US EPA method or use ASTM D 6581-00).

As discussed above, it is desirable to control the chlorate generation during the electrolytic process, i.e. hypochlorite production process. The optimum operating parameters were finalized through a laboratory test and were implemented at site.

Figure 13:
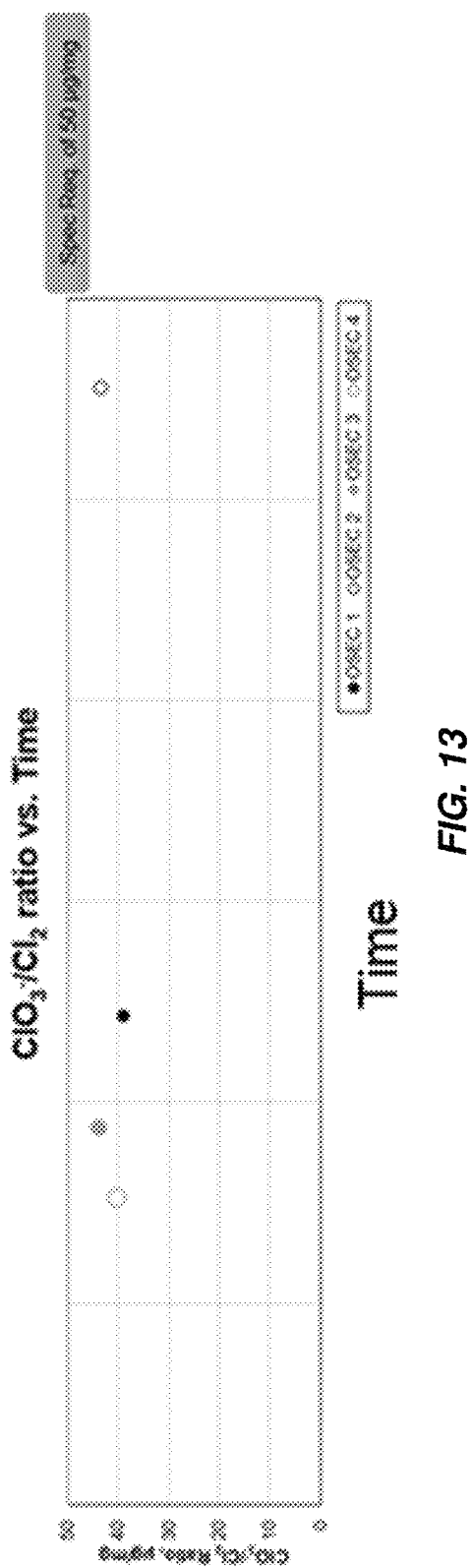
FIG. 13 illustrates chlorate to chlorine ratios in a product stream of an electrochlorination system optimized in accordance with methods disclosed herein.

After several trials desired results were observed consistently. All OSEC units produced $[ClO_3^-]/[Cl_2]$ ratio below 50 µg/mg as illustrated in FIG. 13.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. An electrochlorination process, comprising:
treating water from a source of water in a water conditioning system that removes at least a portion of anions and cations from the water to produce demineralized water;
blending the demineralized water with sodium chloride to form a brine solution;
forming a disinfection solution including sodium hypochlorite having a chlorate concentration of less than 0.25 mg/L by introducing the brine solution into an electrolyzer; and
controlling a shut off valve disposed downstream of the electrolyzer responsive to the chlorate concentration in the disinfection solution.

2. The method of claim 1, wherein treating the water in the water conditioning system includes treating the water in a pressure driven separation apparatus.

3. The method of claim 1, wherein treating the water in the water conditioning system includes treating the water in an electrically driven separation apparatus.

4. The method of claim 1, wherein treating the water in the water conditioning system includes treating the water in a distillation unit.

5. The method of claim 1, further comprising blending the demineralized water with the brine solution.

6. The method of claim 5, wherein blending demineralized water with the brine solution comprises mixing the demineralized water with the brine solution at a flow rate ratio of demineralized water to brine solution in a range of from about 8:1 to about 13:1.

7. The method of claim 1, further comprising adjusting a pH of the water from the source of water to a pH in a range of between about 6 and about 10.

8. The method of claim 1, wherein forming the disinfection solution includes operating the electrolyzer to produce the disinfection solution having a concentration in a range of between about 0.5 wt % and about 1.0 wt % sodium hypochlorite.

9. The method of claim 1, further comprising monitoring and controlling at least one of sodium chloride concentration of the brine solution introduced into the electrolyzer and a flow rate of the brine solution introduced into the electrolyzer.

10. The method of claim 1, wherein monitoring and controlling the sodium chloride concentration of the brine solution introduced into the electrolyzer comprises forming a brine solution with a sodium chloride concentration of between about 22 g/L and about 30 g/L.

11. The method of claim 1, further comprising monitoring and controlling at least one of temperature of the brine solution introduced into the electrolyzer, temperature of the disinfection solution, or power supplied to the electrolyzer.

12. The method of claim 1, further comprising introducing the brine solution into the electrolyzer at a temperature of between about 10 degrees Celsius and about 30 degrees Celsius.

13. The method of claim 1, further comprising operating the electrolyzer with a current density of between about 1.06 amp/in$^2$ and about 1.17 amp/in$^2$ of electrode area.

14. The method of claim 1, wherein treating the water from the source of water comprises treating potable water from a potable water source.

15. An electrochlorination system comprising:
a water conditioning system fluidly connectable to a source of water, the water conditioning system configured to remove at least a portion of anions and cations from the water to produce demineralized water;
a blending vessel fluidly connectable downstream from an outlet of the water conditioning system, the blending vessel including an inlet fluidly connectable to a source of sodium chloride and a brine solution outlet, the blending vessel configured to mix sodium chloride from the source of sodium chloride and the demineralized water to produce brine solution;
an electrolyzer having an inlet fluidly connectable with the brine solution outlet and configured to receive the brine solution;
a controller configured to regulate power from a power source delivered power to the electrolyzer at a current sufficient to generate a sodium hypochlorite solution having a chlorate concentration of less than about 0.25 mg/L; and
a shut off valve downstream of the electrolyzer, the controller further configured to close the shut off valve responsive to a level of chlorate in the sodium hypochlorite solution being above a specified limit.

16. The system of claim 15, further comprising a source of potable water in fluid communication with the blending vessel.

17. The system of claim 15, wherein the water conditioning system comprises a pressure driven separation system.

18. The system of claim 15, wherein the water conditioning system comprises an electrically driven separation apparatus.

19. The system of claim 15, wherein the water conditioning system comprises a distillation unit.

20. The system of claim 15, wherein the controller is further configured to monitor and control at least one of sodium chloride concentration of the brine solution, flow rate of the brine solution to be received by the electrolyzer, and temperature of the brine solution to be received by the electrolyzer.

21. The system of claim 20, wherein the controller is further configured to control introduction of the sodium chloride and water into the blending vessel to form the brine solution with a sodium chloride concentration of between about 22 g/L and about 30 g/L.

22. The system of claim 20, further comprising a heat exchanger fluidly connectable between the brine solution outlet and the inlet of the electrolyzer, the heat exchanger connectable to the controller, the controller being further configured to allow adjustment of a temperature of the brine solution to a temperature in a range of from about 10 degrees Celsius to about 30 degrees Celsius.

23. The system of claim 20, further comprising a source of demineralized dilution water fluidly connectable to the brine solution from the blending vessel, wherein the controller is further configured to cause the dilution water and the brine solution into the electrolyzer at a ratio of flow rates of 8:1 to 13:1 dilution water to brine solution.

24. The system of claim 15, wherein the controller is further configured to monitor and control at least one of temperature of the sodium hypochlorite solution, or power supplied to the electrolyzer.

25. The system of claim 24, wherein the controller is further configured to operate the electrolyzer with a current density of between about 1.06 amp/in$^2$ of electrode area and about 1.17 amp/in$^2$ of electrode area.

26. The system of claim 15, further comprising a source of pH adjustment solution fluidly connectable to the source of water and configured to maintain a pH of water from the source of water between about 6 and 10.

27. A method of modifying an electrochlorination system having an electrolyzer fluidly connected to a source of brine solution, the method comprising:
providing a water conditioning system configured to remove a portion of anions and cations from water from a source of water and produce demineralized water;
providing a controller configured to communicate with the electrochlorination system and configured to cause the electrochlorination system to mix the demineralized water with the brine solution, and to operate the electrolyzer under conditions sufficient to generate a sodium hypochlorite solution having a concentration of chlorate of less than 0.25 mg/L;
providing a shut off valve to be installed downstream of the electrolyzer; and
programming the controller to control the shut off valve responsive to a level of chlorate in the sodium hypochlorite solution.

28. The method of claim 27, further comprising a providing and installing a pH adjustment sub-system including a pH adjustment solution metering valve or pump configured to dose the water from the source of water with the pH adjustment system solution in an amount sufficient to maintain a pH of the water from the source of water at between about 6 and about 10.

* * * * *